(12) United States Patent
Saito et al.

(10) Patent No.: US 7,168,255 B2
(45) Date of Patent: Jan. 30, 2007

(54) MAGNETIC COMPOSITE MATERIAL AND METHOD FOR PRODUCING THE SAME

(75) Inventors: Akiko Saito, Kawasaki (JP); Tadahiko Kobayashi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 417 days.

(21) Appl. No.: 10/808,277

(22) Filed: Mar. 25, 2004

(65) Prior Publication Data

US 2004/0231338 A1 Nov. 25, 2004

(30) Foreign Application Priority Data

Mar. 28, 2003 (JP) ............... 2003-091969
May 30, 2003 (JP) ............... 2003-155469

(51) Int. Cl.
 *F25B 21/00* (2006.01)
 *B22F 3/00* (2006.01)
(52) U.S. Cl. ..................... 62/3.1; 252/62.55
(58) Field of Classification Search ............ 62/3.1; 252/62.55
 See application file for complete search history.

(56) References Cited

U.S. PATENT DOCUMENTS

| 4,036,568 A | 7/1977 | Morlet et al. |
| 5,593,517 A | 1/1997 | Saito et al. |
| 5,743,095 A | 4/1998 | Gschneidner, Jr. et al. .... 62/3.1 |
| 6,676,772 B2 | 1/2004 | Saito et al. .................. 148/301 |
| 2003/0051774 A1 | 3/2003 | Saito et al. |

FOREIGN PATENT DOCUMENTS

GB 1 481 713 8/1977

OTHER PUBLICATIONS

Feng-xia Hu, et al., "Magnetic Entropy Change in La(Fe$_{0.98}$Co$_{0.02}$)$_{11.7}$Al$_{1.3}$", J. Phys.: Condens. Matter, Vol. 12, 2000, pp. L691-L696.

(Continued)

*Primary Examiner*—Cheryl Tyler
*Assistant Examiner*—Barry Clayton McCraw
(74) *Attorney, Agent, or Firm*—Oblon, Spivak, McClelland, Maier & Neustadt, P.C.

(57) ABSTRACT

The magnetic composite material of the present invention is used as a working substance in the magnetic refrigeration system and comprising at least two phases, including, a first phase composed of an intermetallic compound represented by a general formula: La(Fe(Co, Ni)Si)$_{13}$, having an NaZn$_{13}$ type crystal structure, and a second phase is composed of an iron alloy containing Si. The first phase is precipitated in an expansion size of 100 μm or less in average. Preferably, the magnetic composite material contains Fe as a principal component, La in an amount from 4 atomic % to 12 atomic %, Si in an amount from 2 atomic % to 21 atomic %, and Co and Ni in a total amount from 0 atomic % to 11 atomic %, and the total amount of Fe, Co and Ni being from 75 atomic % to 92 atomic %.

20 Claims, 12 Drawing Sheets

OTHER PUBLICATIONS

X. X. Zhang, et al., "Magnetic Entropy Change in Fe-Based Compound LaFe$_{10.8}$Si$_{2.4}$", Applied Physics Letters, vol. 77, No. 19, Nov. 6, 2000, pp. 3072-3074.

S. Fujieda, et al., "Large Magnetocaloric Effect in La(Fe$_x$Si$_{1-x}$)$_{13}$ Itinerant-Electron Metamagnetic Compounds", Applied Physics Letters, vol. 81, No. 7, Aug. 12, 2002, pp. 1276-1278.

C. Zimm, et al., "Description and Performance of a Near-Room Temperature Magnetic Refrigerator", Advances in Cryogenic Engineering, vol. 43, 1998, pp. 1759-1766.

A. Fujita, et al., "Giant Magnetovolume and Magnetocaloric Effects in Itinerant-Electron Metamagnetic La(Fe$_x$Si$_{1-x}$)$_{13}$ Compounds", Materia Japan, vol. 41, No. 4, Apr. 20, 2002, pp. 269-275.

U.S. Appl. No. 10/808,277, filed Mar. 25, 2004, Saito et al.

U.S. Appl. No. 11/365,683, filed Mar. 02, 2006, Tsuji et al.

F. X. Hu, et al., "Magnetic entropy change and its temperature variation in compounds LA(Fe$_{1-x}$Co$_x$)$_{11.2}$Si$_{1.8}$", Journal of Applied Physics, vol. 92, No. 7, XP-012057320, Oct. 1, 2002, pp. 3620-3623.

U.S. Appl. No. 10/403,119, filed Apr. 1, 2003, Fukamichi et al.

100 μm

100 μm

100 μm

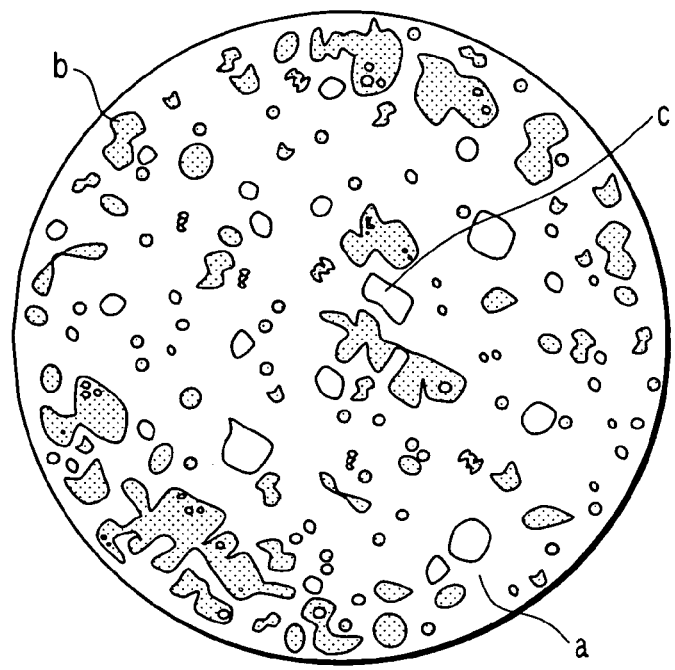
F I G. 10
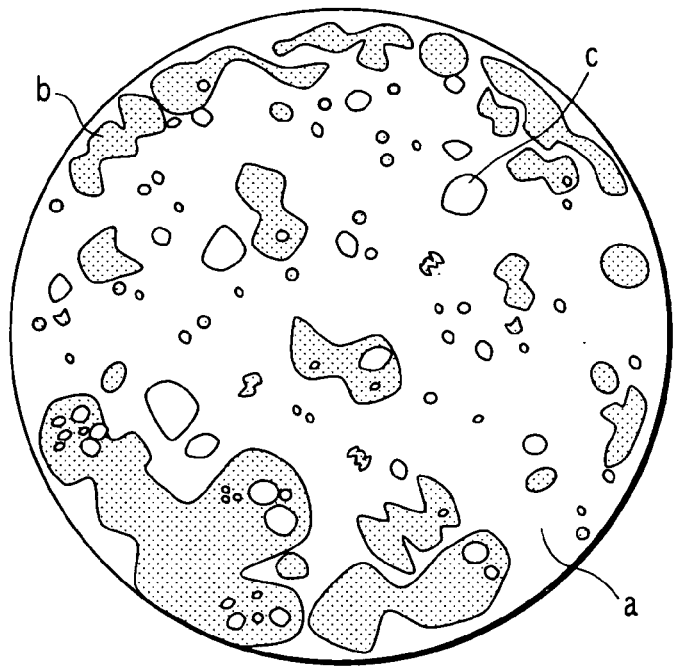
F I G. 11

MAGNETIC COMPOSITE MATERIAL AND METHOD FOR PRODUCING THE SAME

CROSS-REFERENCE TO RELATED APPLICATIONS

This application is based upon and claims the benefit of priority from prior Japanese Patent Applications No. 2003-091969, filed Mar. 28, 2003; and No. 2003-155469, filed May 30, 2003, the entire contents of both of which are incorporated herein by reference.

BACKGROUND OF THE INVENTION

1. Field of the Invention

The present invention relates to a magnetic composite material, and more particularly, to a magnetic composite material capable of realizing a magnetic refrigeration cycle using a magnetic field relatively easily produced by permanent magnets in a room temperature range and a method for producing the magnetic composite material.

2. Description of the Related Art

Recently, the technique for attaining magnetic refrigeration in a room temperature range has been aggressively studied. Magnetic refrigeration generates low temperatures as follows by applying the magnetocaloric effect. This effect is a phenomenon in which the temperature of a magnetic material changes when an external magnetic field is changed with respect to the magnetic material while the magnetic material is thermally insulated.

The entropy of a magnetic material is changed depending on whether a magnetic field is applied or not, owing to the difference between the degrees of freedom of the electron spin system. With this entropy change, the entropy transfers between the electron spin system and the lattice system. A magnetic refrigeration system uses a magnetic material having a large electron spin, and by taking advantage of this large entropy change between the spin system under magnetic field and the spin system without magnetic field, the magnetic refrigeration system generates low temperature.

In 1997, Zimm of the U.S.A. built a prototype of Active Magnetic Refrigeration apparatus (AMR) using a packed column filled with fine spherical Gd, and succeeded in a continuous steady-state operation of the magnetic refrigeration cycle at room temperature for one year or longer (C. Zimm et al., Advances in Cryogenic Engineering, Vol. 43 (1998), p.1759).

U.S. Pat. No. 5,743,095 described a $Gd_5(Ge,Si)_4$-based material, which is an intermetallic compound formed of gadolinium-germanium-silicon, as a magnetic material from which a very large entropy change can be obtained in a room temperature range. For example, $Gd_5(Ge_{0.5}Si_{0.5})_4$ shows a maximum entropy change ($\Delta S$) at about 277K and shows an entropy change ($\Delta S$) of about 20 J/(kg·K) when the magnitude of the external magnetic field is changed from 0 to 5 teslas at about 277 K, and shows an entropy change ($\Delta S$) of about 15 J/(kg·K) when the magnitude of the external magnetic field is changed from 0 to 2 teslas. That is, a large entropy change twice or more that of Gd is observed near room temperature. However, to produce large external magnetic field of about 2 to 5 teslas, usually a superconducting magnet must be used. It is impractical to apply a system using a superconducting magnet to ordinary purposes such as refrigeration and air-conditioning.

Furthermore, as a magnetic material capable of obtaining a large entropy change in the range of a magnetic field having a magnitude of, for example, 1 tesla or less, which can be relatively easily produced by permanent magnets in a room temperature range, a lanthanum-iron-silicon $La(Fe, Si)_{13}$ based intermetallic compound has been proposed (Japanese Patent Application KOKAI No. 2002-356748, F. X. Hu et al., J. Phys. Condens. Matter, 12 (2000), L691; X. X. Zhang et al., Appl. Phys. Lett., Vol. 77, No. 19 (2000), p. 3072; S. Fujieda et al., Appl. Phys. Lett., Vol. 81, No. 7 (2002), p. 1276; and Fujita et al., Materia, Vol. 41, No. 4 (2002), p269).

When these magnetic materials are used as a working substance (hereinafter referred to as a "magnetic refrigeration working substance") for generating a cycle of temperature in a magnetic refrigeration system, in addition to exhibiting a significantly large temperature difference due to the magnetocaloric effect, it is necessary to exchange heat between the magnetic material and a heat exchange medium effectively. To attain this, these magnetic materials must be processed into a shape having a large specific surface and capable of bringing into sufficient contact with the flow of a heat-exchanging medium. As a specific shape, a honeycomb, which is formed by processing a magnetic material into a thin film and folded like an accordion, a laminate mesh, or spherical particles so as to be packed into a container are considerable.

Furthermore, these magnetic materials are required to have a sufficient mechanical strength for the reasons below. When a cycle of temperature is produced in the magnetic refrigeration system, a magnetic refrigeration working substance is exposed to a flow of a gaseous or liquid heat exchange medium and receives pressure and heat shock. In the case of a brittle magnetic refrigeration working substance, if pressure and heat shock are repeatedly given to the brittle substance, crack and cleavage are produced, generating fine particles. The fine particles thus produced will block the flow channel of a heat-exchanging medium, reducing the performance of the refrigeration system. Particularly, if spherical particles are contained in a magnetic refrigerating chamber, particles collide with each other or strike a chamber wall, generating fine particles. As a result, it may become difficult to maintain a space between particles constant. Consequently, the loss of pressure of the heat exchange medium significantly increases, the performance of the refrigeration system deteriates.

However, gadolinium-germanium-silicon based or lanthanum-iron-silicon based intermetallic compounds are very brittle similarly to most of intermetallic compounds containing rare earth elements and low in mechanical strength compared to Gd metal. Furthermore, the gadolinium-germanium-silicon based and lanthanum-iron-silicon based intermetallic compounds are poor in ductility and malleability similarly to other intermetallic compounds containing rare earth elements. Therefore, mechanical processing of these intermetallic compounds including metal rolling, wire drawing, bending, and shaving is difficult compared to a single metal (such as Cu, Al and Gd) and an alloy material including a Cu based, Fe based and Gd based alloys (such as brass, stainless steel, and permalloy).

Furthermore, since rare earth elements generally have a high chemical activity, the Gd or La containing intermetallic compounds mentioned above are relatively easily oxidized similarly to other intermetallic compounds containing rare earth elements. In particular, the reactivity of the intermetallic compounds with oxygen and nitrogen is high at a high temperature exceeding 1500° C. In other words, the intermetallic compounds react with both oxygen and nitrogen easily. The lighter the molecular weight of a rare earth element, the higher the oxidation activity.

As described above, the gadolinium-germanium-silicon based and lanthanum-iron-silicon based intermetallic compounds are poor in ductility and malleability. Therefore, mechanical processing of such intermetallic compounds into a mesh or sheet is difficult. On the other hand, as a method of forming spherical particles, generally the following methods are known.

(a) A raw material is cut into appropriate pieces, which are then allowed to collide with each other and polished to round into spherical particles;

(b) A raw material is melted in a crucible and the melt is supplied dropwise from a nozzle provided on the tip of the crucible into a sufficiently large gaseous bath (or a liquid bath), to form spherical particles with the help of surface tension and cooled with a gas (or liquid) through heat exchange to solidify the particles (called "atomizing method");

(c) A raw material is melted in a crucible and the melt is injected on a disk rotating at a high speed. Then, the melt is dropped out from the rotating disk to solidify as particles (called "rotating disk process");

(d) Broken pieces of a raw material are melted by a plasma jet, sprayed, and solidified into powders (called "plasma-spray method"); and (e) While an electrode rod formed of a raw material is rotated at a high speed, a current is supplied by a plasma arc discharge. In this manner, the surface of an electrode rod is melt and a melt is simultaneously atomized by centrifugal force and solidified into powder (called "rotating electrode process").

However, the gadolinium-germanium-silicon based and lanthanum-iron-silicon based intermetallic compounds are very brittle and poor in mechanical strength. Therefore, it is impossible to apply the mechanically spheroidizing process (a) to the compounds.

The intermetallic compounds mentioned above have a high melting temperature of more than 1,500° C., however, the reactivity of the intermetallic compounds to oxygen and nitrogen become extremely high at the melting point or more. Therefore, it is not easy to spheroidize the intermetallic compounds by the atomizing method (b) or rotating disk process (c) using a crucible formed of quartz, alumina, zirconia, BN, or AlN which contain oxygen or nitrogen.

In contrast, the plasma spray method (d) does not employ a crucible and is thus free from the problems mentioned above. In this method, since broken pieces of a raw material are vigorously sprayed together with a plasma jet, the broken pieces are exposed to high temperature only for a short time. This method is therefore suitably used for producing relatively small spherical particles but not suitable for producing relatively large spherical particles. To explain more specifically, to form relatively large particles in diameter, broken pieces are solidified before the pieces are sufficiently melted. As a result, some pieces still keep original shapes or other pieces have corners. Therefore it is difficult to obtain virtually spherical particles. In the aforementioned intermetallic compounds, the plasma spray method (d) is suitable for providing spherical powder of particles having a small diameter of 0.01 mm or less. However, when spherical particles having a relatively large particle diameter (from 0.2 mm to 2 mm) are produced, the ratio of irregular particles increases, conversely virtually spherical particles significantly decreases.

Besides the methods mentioned above, there is a rotating electrode process using no a crucible. In this method, since an electrode rod is rotated at high speed, the material for the electrode rod must have sufficient mechanical strength. More specifically, the electrode rod must be strongly fixed onto a rotation axis during melt. The electrode rod is fixed by a chuck that is widly used in a lathe, or by a screw that is formed at the end of the electrode rod so as to have thread in reverse direction. However, the intermetallic compounds are very brittle and poor in mechanical strength, so that it is difficult to fix the electrode rod made of an intermetallic compound by a chuck with a force sufficient to withstand rapid rotation. In addition, since the intermetallic compounds are poor in ductility and malleability, it is difficult to shave thread into it. Therefore, it is difficult to apply a spheroidizing process using the rotating electrode process (e) to such brittle materials represented by the intermetallic compounds.

As mentioned above, the gadolinium-germanium-silicon based and lanthanum-iron-silicon based intermetallic compounds have an excellent characteristic of a large magnetocaloric effect; however, it has a practical problem: it is not sufficient in mechanical strength for working as a magnetic refrigeration working substance for long period, and it is difficult for such an intermetallic compound to be formed into a shape suitable for a magnetic refrigeration working substance.

BRIEF SUMMARY OF THE INVENTION

The present invention was attained in view of the aforementioned problems of a magnetic material used as a working substance in a magnetic refrigeration system. An object of the present invention is to provide a magnetic material which is capable of realizing a magnetic refrigeration cycle using a relatively low magnetic field in a normal temperature region [e.g., −78° C.(a temperature of dry ice) to +80° C. (temperature of hot water)], and which has sufficient mechanical strength required for a magnetic refrigeration working substance to be used in the magnetic refrigeration system and processability to be formed into an appropriate shape. Further, another object of the present invention resides in providing a method for producing such a magnetic material and a magnetic refrigeration system using such a magnetic material.

According to the present invention, there is provided a magnetic composite material comprising at least two phases and used as a working substance in a magnetic refrigeration system, in which a first phase is composed of an intermetallic compound represented by a general formula:

$$La(Fe(Co,Ni)Si)_{13},$$

having an $NaZn_{13}$ type crystal structure, and precipitated in an expansion size of 100 µm or less in average; and a second phase is composed of an iron alloy containing Si.

The magnetic composite material of the present invention has a microstructure constituted of at least two phases. A first phase is an intermetallic compound having an $NaZn_{13}$ type cubic system crystal structure in which Na-positions are occupied by La and Zn-positions are occupied by Fe and Si. Incidentally, part of Fe can be substituted by Co and/or Ni. By defining that the upper limit of Fe occupying Zn-positions is about 12%, an excellent magnetocaloric effect can be obtained in a normal temperature range.

Such an intermetallic compound has a large magnetocaloric effect as previously explained; however, the compound itself is brittle and poor in mechanic strength. The second phase, which is formed of an iron alloy containing Si, is high in mechanical strength and ductility. Therefore, by dispersing the iron alloy phase having high ductility into a phase constituted of the intermetallic compound, the entire mechanical strength of a magnetic composite material can be improved while maintaining a large magnetocaloric effect due to the intermetallic compound. Furthermore, the second phase is formed of a soft magnetic material having a high magnetic permeability. Therefore, even though a relatively low magnetic field is externally applied, the magnetic field can be transferred to the $NaZn_{13}$ type intermetallic compound without a loss.

Furthermore, in the magnetic composite material of the present invention, the first phase formed of the intermetallic compound is limited to precipitate in an expansion size of 100 μm or less in average. By limiting the expansion of the intermetallic compound phase within 100 μm or less, if cracks are generated in the intermetallic compound, they can be blocked by the iron alloy phase having high ductility, preventing crack growth. Consequently, the entire mechanical strength of the magnetic composite material can be maintained.

The "average expansion size" used herein is defined as a value obtained by the following method. The magnetic composite material is sectioned and, in the texture of the section, 10 points are selected within the first phase at random. As a next step, with respect to each of the points, the largest circle is drawn such that the point itself is included but the second phase is not included. The diameters of 10 circles thus obtained are averaged. This procedure is repeated several times until a reproducible average value is obtained. The value is defined as the "average expansion size".

It is preferable that the magnetic composite material contains Fe as a principal component, La in an amount from 4 atomic % to 12 atomic %, Si in an amount from 2 atomic % to 21 atomic %, and Co and Ni in a total amount from 0 atomic % to 11 atomic % and the total amount of Fe, Co and Ni is from 75 atomic % to 92 atomic %.

The content of La is set from 4 atomic % to 12 atomic %, whereby the constitution ratio of the first phase having an $NaZn_{13}$ type crystal structure increases, providing an excellent magnetocaloric effect in a normal temperature range. The content of Si is set at 2 atomic % or more, whereby Si is appropriately contained in the iron alloy phase (second phase), imparting a good soft magnetic characteristics to the second phase. On the other hand, Si is set at 21 atomic % or less, whereby the mechanical strength of in iron alloy phase increases, maintaining the mechanical strength of the entire magnetic composite material.

According to the results of a test performed by the present inventors, an appropriate content of Si in iron alloy phase (second phase) imparting not only soft magnetic characteristics to the phase but also sufficient mechanical strength is 0.5 to 5 atomic %, more preferably, 1 to 3 atomic %. To obtain a second phase satisfying such a condition, it is preferable that the Si content of the entire composite material is set at 13 atomic % or less.

The total content of Fe, Co, and Ni is set at 75 atomic % or more, whereby an excellent magnetocaloric effect can be obtained in a normal temperature range. On the other hand, to obtain an excellent magnetocaloric effect in a normal temperature range by maintaining the constitution ratio of the first phase having an $NaZn_{13}$ crystal structure at a high value, it is preferable that the total content of Fe, Co and Ni is set at 92 atomic % or less.

Furthermore, in the first phase having an $NaZn_{13}$ crystal structure, by controlling the content of Co and Ni within magnetic elements (i.e., Fe, Co, and Ni) that occupy the Zn-positions, it is possible to vary the temperature range in which a large magnetocaloric effect is obtained. A preferable total content of Co and Ni satisfying this condition is 11 atomic % or less.

Preferably, the second phase has a body-centered cubic crystal structure or a face-centered cubic crystal structure.

If the second phase has a cubic crystal system structure similarly to the first phase, when the magnetic composite material is exposed to a cycle of temperature, the dimensional change of a crystal lattice isotropically proceeds in accordance with a temperature change in both phases. Distortion, if occurs, can be absorbed effectively by the entire magnetic composite material. Consequently, causes of cracks can be eliminated by this feature, so that the mechanical strength of the magnetic composite material can be maintained for a long time.

The magnetic composite material according to the present invention may sometimes have a third phase composed of a compound containing La as a principal element.

The magnetic composite material according to the present invention, when it is used as a working substance in the magnetic refrigeration system, is required to be formed into a shape realizing a sufficient heat exchange with medium, for example into particles. If smooth particles are formed without projections on the surface, the particles are prevented from breaking down, reducing generation of fine particles, with the result that the pressure loss of a heat exchange medium in flow channel can be suppressed. Hence, the magnetic composite material is formed into spherical or spheroidal particles having the minor axis of 0.2 mm or more and the major axis of 2 mm or less.

In the spherical or spheroidal particles formed of magnetic composite material, if the particle diameter is too small, a pressure loss of a heat exchange medium increases, generating heat, which decreases a refrigeration performance. On the contrary, if the particle diameter is too large, the specific surface of the magnetic composite material per unit volume of a container decreases, a heat exchange efficiency between the magnetic composite material and a heat exchange medium decreases, lowering a refrigeration performance. More specifically, a pressure loss of a heat exchange medium can be reduced by setting the minor axis at 0.2 mm or more, whereas a high heat exchange efficiency can be obtained by setting the major axis at 2 mm or less.

As a heat exchange medium according to the present invention, a mineral oil, a solvent, water or a mixture thereof may be appropriately selected depending upon the operation temperature region of a magnetic refrigeration system. The diameter of particles formed a magnetic composite material can be appropriately set within the aforementioned range depending upon the viscosity and back pressure (determined by the capacity of a pump or motor) of the hear exchange medium to be used.

In the magnetic refrigeration system, the magnetic particles are packed in a magnetic refrigerating chamber with a space through which a heat exchange medium can flow. If the packing density of magnetic particles in the magnetic refrigerating chamber is low, the magnetic particles jumps up and down by the flow of the heat exchange medium and collide with each other in heat exchanging with the heat exchange medium. When frequent collision occurs, magnetic particles become cracked and broken into fine powder, which increases a pressure loss of the heat exchange medium, and reduces a refrigeration performance.

The aforementioned problems can be solved by sintering the magnetic particles to form a porous body. In this case, the magnetic particles are sintered at a temperature lower than a melting point of the composite magnetic material, thereby combining the particles through interdiffusion of atoms of constituent elements. Preferably, the sintered body has the particles in a content of 70 weight % or more and a voidage from 25% to 60%.

According to the embodiment the present invention, there is provided a method for producing a magnetic composite material for use in a magnetic refrigeration system as a working substance, comprising:

a first step of producing an ingot comprising, as a main phase, an Si-containing iron alloy of a body-centered cubic structure which is formed by melting a raw material containing Fe as a principal component, La in an amount from 4 atomic % to 12 atomic %, Si in an amount from 2 atomic % to 21 atomic %, and Co and Ni in a total amount from 0 atomic % to 11 atomic %; the total amount of Fe, Co and Ni being from 75 atomic % to 92 atomic %;

a second step of producing a particle, flat-plate or linear form intermediate constituted of at least two phases including a main phase formed of an Si-containing iron alloy and a sub phase formed of La as a principal component; and a third step of subjecting the intermediate to annealing to diffuse atoms of constituent elements each other, thereby precipitating an intermetallic compound represented by a general formula:

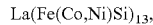

$La(Fe(Co,Ni)Si)_{13}$, and having an $NaZn_{13}$ type crystal structure.

The interdiffusion of the constitutional elements is performed by, for example, solid phase diffusion.

Preferably, in the second step, the ingot is processed into an electrode rod, which is then melted by a rotating electrode process to obtain the intermediate of particle form.

Preferably, the particulate intermediate bodies are classified to obtain spherical or spheroid particles having the minor axis of 0.2 mm or more and the major axis of 2 mm or less, and subjected to the annealing mentioned above.

Note that as the intermediate, plate or wire may be used. The plate can be produced by rolling the ingot, whereas the wire can be produced by drawing the ingot.

A magnetic refrigeration system using the magnetic material based on the present invention comprises a magnetic refrigerating chamber, inlet pipe, outlet pipe, and permanent magnets, as main component. The magnetic material is packed into the magnetic refrigerating chamber. A heat exchange medium is supplied into the magnetic refrigerating chamber through the inlet pipe and discharged through the outlet pipe. The permanent magnets are placed near the magnetic refrigerating chamber. By changing the position of these permanent magnets relative to the magnetic refrigerating chamber, a magnetic field is applied to and removed from the magnetic material. The magnetic material is cooled by removing the magnetic field and then cools the heat exchange medium by heat exchange.

Preferably, the outlet pipe is branched into two piping systems. The first output pipe is used to extract, from the magnetic refrigerating chamber, the heat exchange medium used in precooling the interior of the magnetic refrigerating chamber. The second output pipe is used to extract, from the magnetic refrigerating chamber, the heat exchange medium cooled in the magnetic refrigerating chamber. To change the position of the permanent magnets relative to the magnetic refrigerating chamber, a driving unit is used. The permanent magnets are attached to this driving unit. In synchronism with a change of the relative position of these permanent magnets, the outlet path of the heat exchange medium from the magnetic refrigeration chamber is switched between the first outlet pipe and the second outlet pipe. As described above, a magnetic refrigeration cycle is constituted.

According to the magnetic composite material of the present invention, a magnetic refrigeration cycle using a relatively low magnetic filed can be realized in a normal temperature range. Furthermore, the magnetic composite material, since it has an excellent mechanical strength, has a basic performance required for a magnetic refrigeration working substance for an industrial or household application. According to the production method of the embodiment the present invention, it is possible to obtain a magnetic composite material processed into a shape suitable for practical use.

BRIEF DESCRIPTION OF THE SEVERAL VIEWS OF THE DRAWING

FIG. 10 is a view showing a section of a microstructure of sample 101;

FIG. 11 is a view showing a section of a microstructure of sample 104;

DETAILED DESCRIPTION OF THE INVENTION

Now, a magnetic composite material and a method for producing the same will be explained with reference to examples.

<Casting of Mother Alloy>

Fe, Co, Si, and La were blended in the content ratio of 82:5:6:7. The mixture was melted in a high-frequency furnace in an inert gas atmosphere and produced castings in the same atmosphere by varying dimensions and cooling conditions. As a result, 5 types of ingots of mother alloys A to E having different metal textures were prepared. Ar gas was used as an inert gas for mother alloys A, B, D and E, whereas a gas mixture of Ar and He was used for mother alloy C. The casting temperature was 1,500 to 1,600° C. The geometries of ingots were cylindrical and different in diameter and length. Ingots D and E were further subjected to annealing in a vacuum furnace at 1050° C. for a week. Table 1 shows specifications and the results of evaluation tests of ingots of mother alloys A to E.

Figure 1:
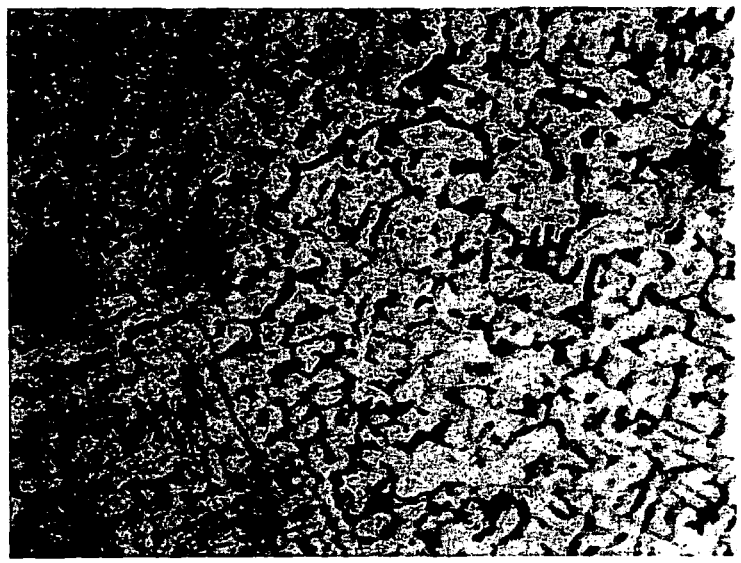
FIG. 1 is a microphotograph of a microstructure of mother alloy A taken by an optical microscope.
Figure 2:
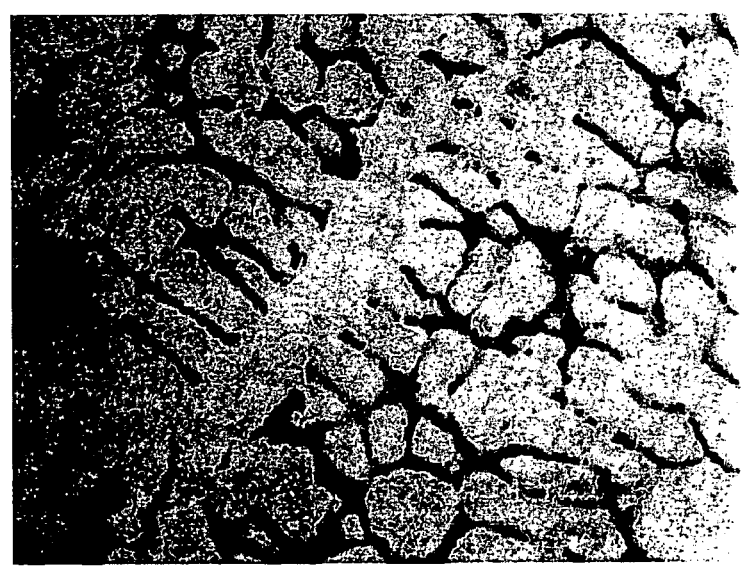
FIG. 2 is a microphotograph of a microstructure of mother alloy B taken by an optical microscope.
Figure 3:
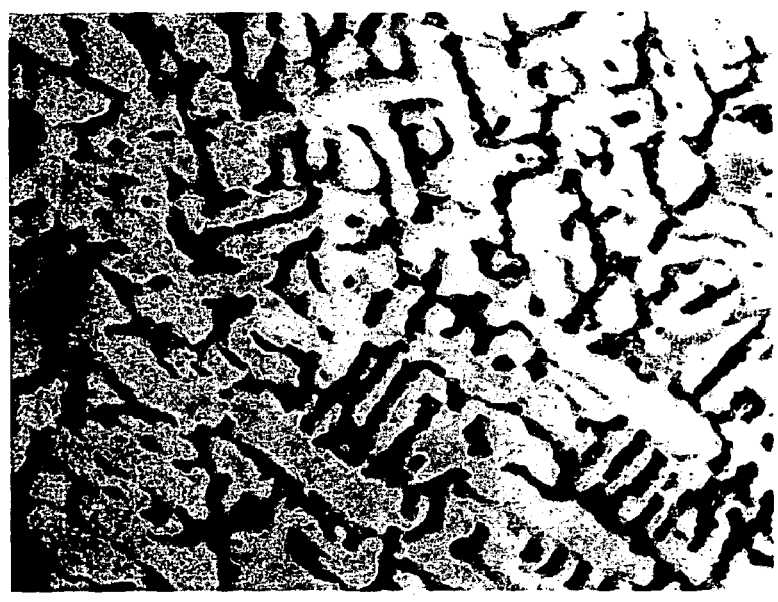
FIG. 3 is a microphotograph of a microstructure of mother alloy C taken by an optical microscope.

Ingots of mother alloys A to C were sectioned and the metal textures thereof were observed by an optical microscope. FIGS. 1 to 3 show optical photomicrographs of microstructures of the mother alloys A to C, respectively. It is found that a main phase and a sub phase are mutually integrated in the mother alloys A to C. The main phases of mother alloys A, B and C have fiber diameters of about several µm to 15 µm, 10 to 30 µm, and several µm to 20 µm, respectively. On the other hand, in the microstructures of mother alloys D and E, island-form sub phases are scattered in the main phase. The sub phases are mostly present like a large island of about several tens to 100 µm, although a small island of about 3 µm is sometimes observed.

The crystal structure of a main phase was analyzed by X-ray diffraction for each mother alloy. Furthermore, section of each ingot was analyzed by Energy dispersive x-ray (EDX) using a SEM to check elements constituting the main phase and sub phase of each mother alloy. As a result, it was found that ingots of mother alloys A to C have the main phase composed of an iron alloy having a body-centered cubic (bcc) crystal structure, and that Si contained in the main phases fall within about 2.2 to 3.2 atomic %, and Co within 3.9 to 4.5 atomic %. In any one of the mother alloys A to C, the content of La in the sub phase was 30 atomic % or more. On the other hand, the mother alloys D and E have the main phase having a $NaZn_{13}$ type cubic crystal structure.

On the one end of each of these 5 mother alloy ingots, a thread was machined. As a result, it is possible to cut a thread on mother alloys A to C without causing cracks, whereas, it is hard to cut a thread on mother alloys D and E, because processed surfaces were brittle and fractured.

Next, the other end of each of the mother alloy ingots was gradually fastened by using a collet-type chuck. Mother alloy ingots A to C were tightly fixed without break, whereas mother alloy ingots D and E was hardly to be fixed tightly in the presence of cracks and fractures caused in the surface of ingots. Then the appearance of each mother alloy ingot was inspected after disengaged from the chuck. As a result, a trace of the collet was observed in each of the mother alloy ingots A to C; however cracks and fractures were not observed.

TABLE 1

Specification of mother alloys A to E and results of fix test

| | | | | Mother alloy | | | | |
|---|---|---|---|---|---|---|---|---|
| | | | | A | B | C | D | E |
| Specification | Atmosphere in dissolution and casting | | | Ar | Ar | Ar + He | Ar | Ar |
| | Weight (kg) | | | 0.2 | 3.4 | 3 | 3.5 | 0.2 |
| | Dimension | Diameter (mmφ) | | 18 mm | 50 mm | 50 mm | 50 mm | 18 mm |
| | | Length (mm) | | 120 mm | 220 cm | 200 mm | 210 cm | 120 mm |
| | Crystal structure of main phase | | | bcc type | bcc type | bcc type | $NaZn_{13}$ type | $NaZn_{13}$ type |
| Fix test | Threading | Possible/impossible | | Possible | Possible | Possible | Impossible | Impossible |
| | Fastening | Appearance observation after fastening | | No crack and fracture | No crack and fracture | No crack and fracture | Cracked | Fractured |
| Constitution | Main phase | Content of principal element (% by atomic mass) Upper stage: Range of analytical value Lower state: Average analytical value | Fe | 92.4–92.7 92.5 | 92.9–93.8 93.4 | 92.5–93.0 92.8 | 79.2–80.1 79.5 | 79.6–80.3 79.9 |
| | | | Co | 4.3–4.5 4.3 | 3.9–4.0 4.0 | 4.1–4.4 4.2 | 5.3–5.8 5.6 | 5.1–5.6 5.4 |
| | | | Si | 2.6–3.2 3.0 | 2.2–2.9 2.6 | 2.3–3.2 2.8 | 7.3–7.6 7.5 | 7.4–7.7 7.6 |
| | | | La | Less than 1 | Less than 1 | Less than 1 | 7.0–7.6 7.36 | 6.9–7.4 7.1 |

As described above, it was found that mother alloy ingots A to C can be fixed by a screw or by a collet type chuck. In contrast, mother alloy ingots D and E, since they were brittle, not only a screw was hardly to be formed but also the collet-type chuck was hardly to be used to fix the alloys.

As described above, even if the content ratio of Fe:Co:Si:La of a mother alloy is substantially the same as that of an intermetallic compound represented by $La(Fe, T, Si)_{13}$, if the metal texture is prepared so as to have a composite texture containing an iron alloy of a bcc structure as a main phase, it is possible to obtain a material excellent in machinability and mechanical strength. The material thus obtained cannot be fractured during operation performed at a high-speed of 10,000 rpm. Therefore, it can be used as an electrode rod for manufacturing particles by the rotating electrode process.

Mother alloy ingots having the following compositions were produced in the same conditions as above.

1. Alloy: Fe:Co:Si:La=about 72:9:11:8 (mother alloy:F);
2. Alloy: Fe:Co:Si:La=about 82:5:5:8 (mother alloy:G);
3. Alloy: Fe:Co:Si:La=about 82:6:5:7;
4. Alloy: Fe:Co:Si:La=about 82:7:4:7;
5. Alloy: Fe:Co:Si:La=about 83:6:4:7;
6. Alloy: Fe:Co:Si:La=about 83.5:5:2.5:7;
7. Alloy: Fe:Co:Si:La=about 71:5:19:5;
8. Alloy: Fe:Co:Si:La=about 75:5:15:5;
9. Alloy: Fe:Co:Si:La=about 83:3:9:5;
10. Alloy: Fe:Co:Si:La=about 82:5:7:6 (mother alloy:K);
11. Alloy: Fe:Co:Si:La=about 84:6:5:5;
12. Alloy: Fe:Si:La=about 75:18:7;
13. Alloy: Fe:Si:La=about 82:11:7;
14. Alloy: Fe:Co:Ni:Si:La=about 81:3:3:6:7 (mother alloy:H);
15. Alloy: Fe:Ni:Si:La=about 82:2:9:7 (mother alloy:I); and
16. Alloy: Fe:Ni:Si:La=about 83:5:5:7.

Note that mother alloys A to I were prepared by adding La in an amount larger by about 3 to 10% than the content defined in a recipe in consideration of reduction by La vaporization or oxidation during dissolution.

As a result, it was found that when the main phase is an iron alloy having a bcc crystal structure and containing Si about 2 to 4.5 atomic %.and the sub phase contains La 30 atomic % or more, it is possible to obtain a material excellent in machinability and mechanical strength. Such a material is easily cut into a screw or capable of being fixed by a collet chuck and thus can be used as an electrode rod in the rotating electrode process.

Furthermore, from mother alloys B, F and G, pieces of 10 mm×10 mm squares and 3 mm thick were cut out and subjected to a rolling test. As a result, it was confirmed that these mother alloys can be easily rolled to a thickness of 1 mm or less.

<Production of Particles by Rotating Electrode Process>

Particles were produced from mother alloys B and C by the rotating electrode process as follows. First, an electrode rod was formed of each of the ingots of the mother alloys with a screw formed by thread-cutting at the one end. The electrode rod was fixed to a rotation axis via the screw. Plasma arc was allowed to discharge between the tip portion of an electrode rod and the counter electrode while rotating the electrode in a direction opposite to the screw-tightening direction. The electrode rod made of a mother alloy was gradually melted from the tip portion and the melted portion is vigorously scattered as liquid drops in a chamber by centrifugal force, cooled by an inert gas through heat exchange, solidified to provide virtually spherical particles.

Note that the scattered liquid drops flied in an inert atmosphere while shaping its liquid form and then solidified. At this moment, the shape of liquid drops is defined by balance between the centrifugal force scattering liquid drops and the surface tension. If a liquid drop still unsolidified reaches the wall of a chamber, the drop is deformed by collision force, rapidly cooled by the chamber wall and solidified. Therefore, the shape and size of particles to be manufactured can be controlled by varying discharge power, the diameter of an electrode rod, and a rotation speed. In this test, when a rotation speed is changed within a range of 1,000 to 10,000 rpm, particles having the major axis of 2.0 mm or less and an aspect ratio of 2 or less can be obtained in high yield.

<Texture of Particles Obtained by Rotating Electrode Process>

Figure 4:
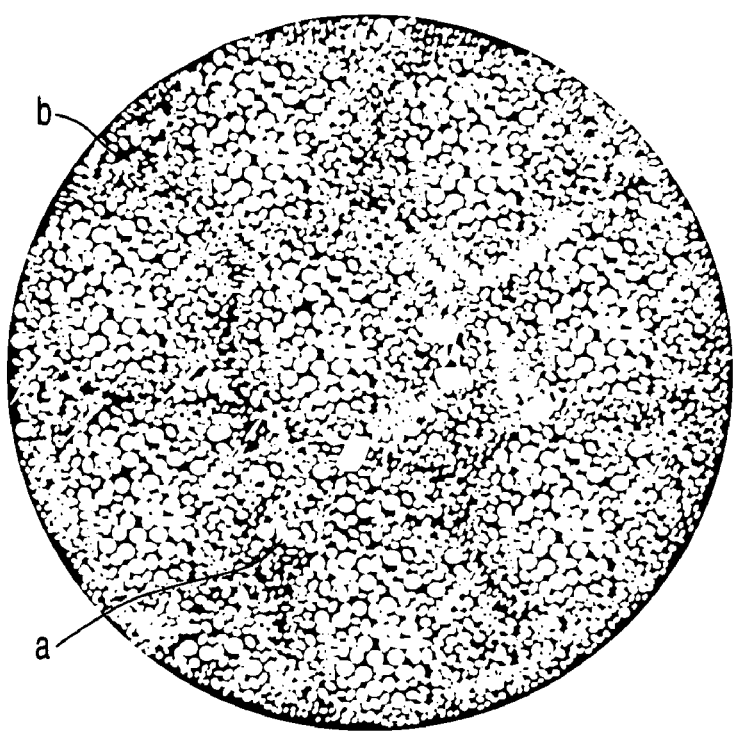
FIG. 4 is a schematic illustration of a microstructure of a section of a particle produced from mother alloys B and C by the rotating electrode process.
Figure 5:
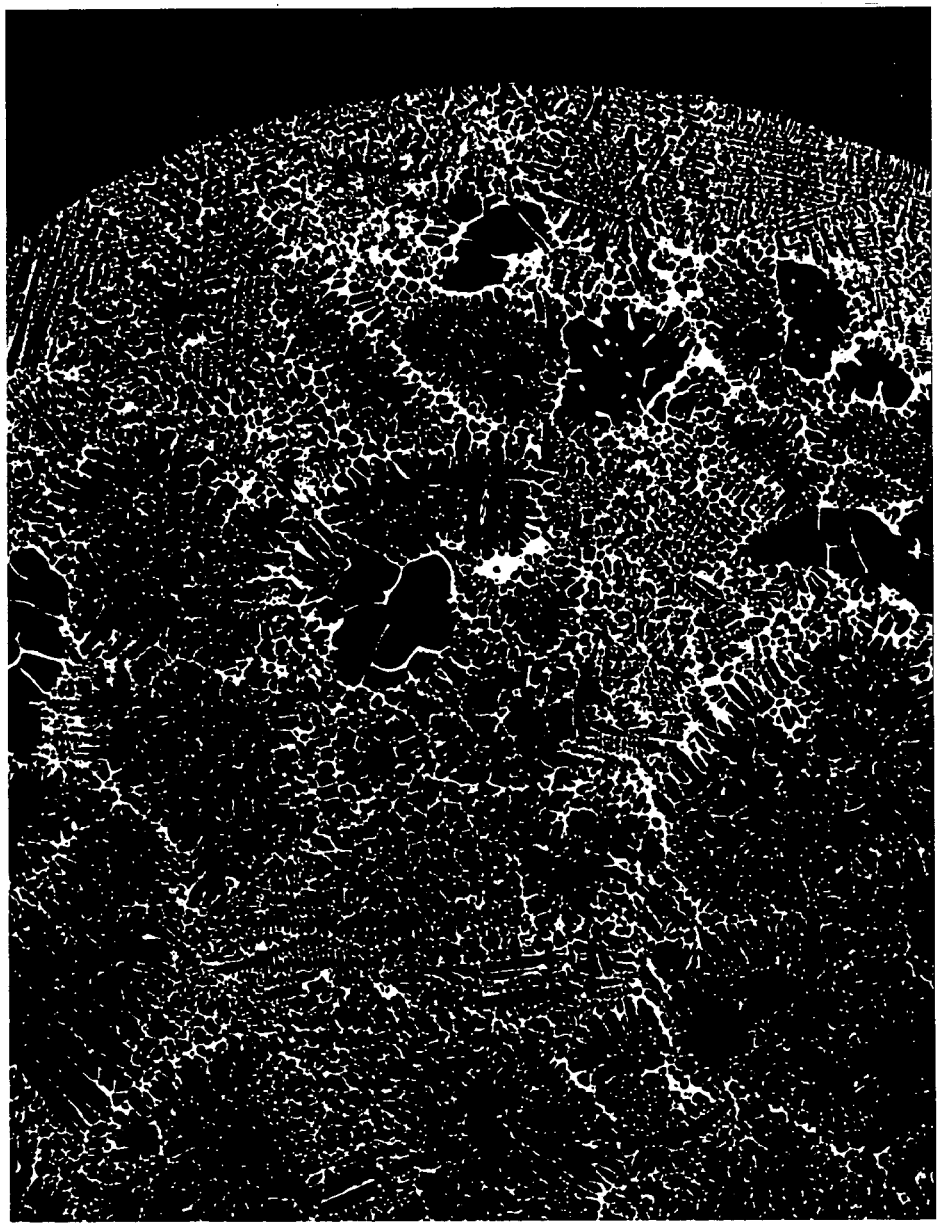
FIG. 5 is a compositional structure, observed by SEM, of a section of a particle produced from mother alloy B by the rotating electrode process.

A sample of about 0.3 g was taken from each particles of mother alloy B and C obtained by the aforementioned method and subjected to structure analysis using X-ray diffraction. As a result, it turned out that the main phase has a bcc structure in every sample. Also, a particle was sectioned and the microstructure of the sectioned surface was examined by SEM. The microstructure of each sample was found to be mainly formed of two phases, constituting an complex texture. FIGS. 4 and 5 respectively show a schematic view of a metal texture and a compositional image of a section of mother alloy B or C by SEM.

The main phase was an iron alloy containing Si, Co and Fe in amounts of about 2.2 to 3.2, 4.1 to 4.5 and 92 to 94 atomic %, respectively. The sub phase had a face-centered cubic structure (fcc) structure containing primarily La and secondarily Si and Co as dominant components.

In particles produced from mother alloy B, the sub phase composed of a La compound having an fcc structure has a lattice constant about twice as large as that of the main phase formed of an iron alloy of a bcc structure, suggesting that two phases are almost lattice-matched. The deviation between them was within about 3%.

<Annealing of Particles for Diffusion>

Particles produced from mother alloys B and C by the aforementioned method were subjected to annealing to facilitate elements to interdiffuse between a main phase, a sub phase, and other phases.

To describe more specifically, particles produced from each of mother alloys B and C were classified into 4 to 5 groups based on particle diameter. A sample of about 10 to 50 g was taken out from each group and annealed under different conditions as follows. First, a sample was placed in a quart tube and baked at about 200° C. in an Ar atmosphere having a vacuum of about $1 \times 10^{-6}$ Torr. After the quart tube was sealed airtight in the Ar atmosphere, it was kept at 800 to 1,250° C. for 1.5 to 16 days.

After annealing, particles of each sample were subjected to structure analysis using X-ray diffraction. More specifically, a particle of about 0.3 g was arbitrarily taken out from each sample and buried in an epoxy resin. The epoxy resin was subjected to wet polishing using a #800 polishing paper to obtain the center-plane section of the particle.

Tables 2 and 3 show the results of X-ray diffraction analysis of aforementioned particle samples. In the tables, the relative ratio of a second phase to a first phase is represented by an intensity ratio of main peaks of both phases obtained in the X-ray diffraction. From the tables, it is found that an intermetallic compound phase having a $NaZn_{13}$ type cubic crystal structure can be precipitated through the annealing. In other words, spherical particles having a high magnetocaloric effect can be prepared by forming an intermetallic compound having an $NaZn_{13}$ type crystal structure through the annealing in accordance with this method.

In the X-ray diffraction patterns of particle samples 9 to 11 heat-treated at a temperature of about 900° C., a pattern corresponding to an $NaZn_{13}$ type cubic crystal structure was observed as a third phase other than first and second phases.

Furthermore, in particle samples 36 and 39 heat-treated at a temperature of about 1150° C., an $NaZn_{13}$ type cubic crystal structure was observed as a third phase. The peak intensity ratio of the third phase to the first phase was about the same as the ratio of the second phase to the first phase.

From the results mentioned above, it was found that 900° C. to 1,120° C. is particularly preferable as a annealing temperature.

TABLE 2

Heat treatment conditions of Samples No. 1 to 25 and the results of XRD structure analysis

| Sample | Temperature maintained t (° C.) | Days maintained (Day) | Particle size (mm) | Crystal structure First phase | Crystal structure Second phase | Ratio of second phase:first phase | Mother alloy |
|---|---|---|---|---|---|---|---|
| 1 | 800 ± 15 | 14 | 0.2–0.43 | bcc type | Unidentified | 0.1 or less | B |
| 2 | 800 ± 15 | 14 | 0.5–0.71 | bcc type | Unidentified | 0.1 or less | B |
| 3 | 800 ± 15 | 14 | 0.85–1.2 | bcc type | Unidentified | 0.1 or less | B |
| 4 | 800 ± 15 | 14 | 1.4–2.0 | bcc type | Unidentified | 0.1 or less | B |
| 5 | 850 ± 15 | 12 | 0.2–0.43 | bcc type | Unidentified | 0.1 or less | B |
| 6 | 850 ± 15 | 12 | 0.5–0.71 | bcc type | Unidentified | 0.1 or less | B |
| 7 | 850 ± 15 | 12 | 0.85–1.2 | bcc type | Unidentified | 0.1 or less | B |
| 8 | 850 ± 15 | 12 | 1.4–2.0 | bcc type | Unidentified | 0.1 or less | B |
| 9 | 900 ± 15 | 10 | 0.2–0.43 | bcc type | Unidentified | 0.15 | B |
| 10 | 900 ± 15 | 10 | 0.5–0.71 | bcc type | Unidentified | 0.17 | B |
| 11 | 900 ± 15 | 10 | 0.85–1.2 | bcc type | Unidentified | 0.17 | B |
| 12 | 900 ± 15 | 10 | 1.4–2.0 | bcc type | $NaZn_{13}$ type | 0.28 | C |
| 13 | 950 ± 15 | 14 | 0.2–0.43 | bcc type | $NaZn_{13}$ type | 0.93 | B |
| 14 | 950 ± 15 | 3.5 | 0.5–0.71 | bcc type | $NaZn_{13}$ type | 0.15 | B |
| 15 | 950 ± 15 | 14 | 0.5–0.71 | $NaZn_{13}$ type | bcc type | ≈1 | B |
| 16 | 950 ± 15 | 14 | 0.85–1.2 | $NaZn_{13}$ type | bcc type | 0.88 | B |
| 17 | 950 ± 15 | 14 | 1.4–2.0 | $NaZn_{13}$ type | bcc type | 0.57 | C |
| 18 | 1000 ± 15 | 12 | 0.2–0.43 | $NaZn_{13}$ type | bcc type | ≈1 | B |
| 19 | 1000 ± 15 | 7 | 0.5–0.71 | $NaZn_{13}$ type | bcc type | 0.48 | C |
| 20 | 1000 ± 15 | 12 | 0.5–0.71 | $NaZn_{13}$ type | bcc type | 0.18 | C |
| 21 | 1000 ± 15 | 12 | 0.85–1.2 | $NaZn_{13}$ type | bcc type | 0.67 | B |
| 22 | 1000 ± 15 | 12 | 1.4–2.0 | $NaZn_{13}$ type | bcc type | 0.21 | C |
| 23 | 1050 ± 15 | 12 | 0.2–0.43 | $NaZn_{13}$ type | bcc type | 0.86 | B |
| 24 | 1050 ± 15 | 1.5 | 0.5–0.71 | bcc type | $NaZn_{13}$ type | 0.11 | B |
| 25 | 1050 ± 15 | 3.5 | 0.5–0.71 | bcc type | $NaZn_{13}$ type | 0.88 | B |

TABLE 3

Heat treatment conditions of Samples No. 26 to 48 and the results of XRD structure analysis

| Sample | Temperature maintained t (° C.) | Days maintained (Day) | Particle size (mm) | Crystal structure First phase | Crystal structure Second phase | Ratio of second phase:first phase | Mother alloy |
|---|---|---|---|---|---|---|---|
| 26 | 1050 ± 15 | 7 | 0.5–0.71 | $NaZn_{13}$ type | bcc type | 0.46 | B |
| 27 | 1050 ± 15 | 16 | 0.5–0.71 | $NaZn_{13}$ type | bcc type | 0.38 | B |
| 28 | 1050 ± 15 | 16 | 0.5–0.71 | $NaZn_{13}$ type | bcc type | 0.21 | C |
| 29 | 1050 ± 15 | 12 | 0.85–1.2 | $NaZn_{13}$ type | bcc type | 0.26 | B |
| 30 | 1050 ± 15 | 12 | 1.4–2.0 | $NaZn_{13}$ type | bcc type | 0.24 | B |
| 31 | 1100 ± 15 | 12 | 0.2–0.43 | bcc type | $NaZn_{13}$ type | 0.58 | B |
| 32 | 1100 ± 15 | 12 | 0.5–0.71 | $NaZn_{13}$ type | bcc type | 0.52 | B |
| 33 | 1100 ± 15 | 12 | 0.5–0.71 | $NaZn_{13}$ type | bcc type | 0.32 | C |
| 34 | 1100 ± 15 | 12 | 0.85–1.2 | $NaZn_{13}$ type | bcc type | 0.44 | B |
| 35 | 1100 ± 15 | 12 | 1.4–2.0 | $NaZn_{13}$ type | bcc type | 0.74 | B |
| 36 | 1150 ± 15 | 12 | 0.43–0.5 | bcc type | Unidentified | 0.18 | B |
| 37 | 1150 ± 15 | 12 | 0.5–0.71 | bcc type | $NaZn_{13}$ type | 0.16 | C |
| 38 | 1150 ± 15 | 12 | 0.85–1.2 | bcc type | $NaZn_{13}$ type | 0.14 | B |
| 39 | 1150 ± 15 | 12 | 1.4–2.0 | bcc type | Unidentified | 0.18 | B |
| 40 | 1200 ± 15 | 12 | 0.43–0.5 | bcc type | Unidentified | 0.2 or less | B |
| 41 | 1200 ± 15 | 3.5 | 0.5–0.71 | bcc type | Unidentified | 0.2 or less | B |
| 42 | 1200 ± 15 | 12 | 0.5–0.71 | bcc type | Unidentified | 0.2 or less | B |
| 43 | 1200 ± 15 | 12 | 0.85–1.2 | bcc type | Unidentified | 0.2 or less | B |
| 44 | 1200 ± 15 | 12 | 1.4–2.0 | bcc type | Unidentified | 0.2 or less | B |
| 45 | 1250 ± 15 | 3.5 | 0.43–0.5 | bcc type | Unidentified | 0.2 or less | B |

TABLE 3-continued

Heat treatment conditions of Samples No. 26 to 48 and the results of XRD structure analysis

| Sample | Temperature maintained t (° C.) | Days maintained (Day) | Particle size (mm) | Crystal structure | | Ratio of second phase:first phase | Mother alloy |
|---|---|---|---|---|---|---|---|
| | | | | First phase | Second phase | | |
| 46 | 1250 ± 15 | 3.5 | 0.5–0.71 | bcc type | Unidentified | 0.2 or less | C |
| 47 | 1250 ± 15 | 7 | 0.85–1.2 | bcc type | Unidentified | 0.2 or less | B |
| 48 | 1250 ± 15 | 7 | 1.4–2.0 | bcc type | Unidentified | 0.2 or less | B |

As described above, by using a mother alloy having an iron alloy phase, which is excellent in mechanical strength and machinability, as a main phase, in place of a brittle intermetallic compound phase having an $NaZn_{13}$ type crystal structure, it is possible to manufacture an electrode rod that withstands the operation performed at a high rotation up to about 10,000 rpm. Then, from the electrode rod, spherical particles were prepared by the rotating electrode process. After that, the spherical particles were subjected to annealing in appropriate conditions, thereby facilitating elements to interdiffuse. As a result, it was confirmed that an intermetallic compound phase having an $NaZn_{13}$ type crystal structure can be precipitated. According to this method, it is possible to produce spherical particles in which an intermetallic compound phase of an $NaZn_{13}$ type crystal structure having a high magnetocaloric effect is precipitated at a high ratio.

Further, experiments were performed to define an appropriate range of the La content. Mother alloys were made in the same manner as above by greatly changing an La ratio, processed into spherical particles, and subjected to annealing to obtain samples. The obtained samples were investigated for their mechanical and magnetic properties. As a result, it was found that when the La content ratio is within the range of 4 to 12 atomic %, it is possible to obtain particles of a magnetic composite material having a large magnetocaloric effect and high mechanical strength.

More specifically, in the case of containing La in an amount of 6 atomic % or less, with a decreasing of the La content, the ratio of iron alloy phase rapidly increases, with the result that the ratio of a phase of an $NaZn_{13}$ type crystal structure exhibiting a high magnetocaloric effect reduces. Investigation was performed in various annealing conditions, more specifically, by annealing at different temperatures in the range from 800 to 1,200° C. and a annealing period from 1.5 to 16 days. As a result, it turned out that, in the case of containing La 4 atomic % or less, under any conditions, a main phase is an iron alloy phase of a bcc type crystal structure and the ratio of a phase having an $NaZn_{13}$ type crystal structure is less than half.

On the other hand, when annealing was performed at an La content of 8 atomic % or more, such a significant change in the texture as seen in the case where annealing was performed at an La content of 6 atomic % or less, was not observed. However, the tendency of gradually decreasing the ratio of a phase of an $NaZn_{13}$ type crystal structure exhibiting a high magnetocaloric effect was observed.

More specifically, the following alloys were made in the same conditions as mentioned above.

1. Alloy: Fe:Co:Si:La=about 74:2:13:11 (mother alloy:L);
2. Alloy: Fe:Co:Si:La=about 73:3:9:15;
3. Alloy: Fe:Co:Si:La=about 77:3:9:11;
4. Alloy: Fe:Co:Si:La=about 75:5:6:14;
5. Alloy: Fe:Co:Si:La=about 79:5:7:9 (mother alloy:M);
6. Alloy: Fe:Co:Si:La=about 76:9:4:11; and
7. Alloy: Fe:Co:Si:La=about 79:9:3:9.

The mother alloys were processed individually into predetermined shapes, subjected to annealing at different temperatures in the range from 800 to 1,200° C. and a treatment period from 1.5 to 16 days. As a result, two of the alloy samples, No. 2 (Fe:Co:Si:La=about 73:3:9:15) and No. 4 (Fe:Co:Si:La=about 75:5:6:14), had an iron alloy phase of a bcc type crystal structure as a main phase and the ratio of a phase having an $NaZn_{13}$ type crystal structure is one third or less in either annealing conditions.

Figure 6:
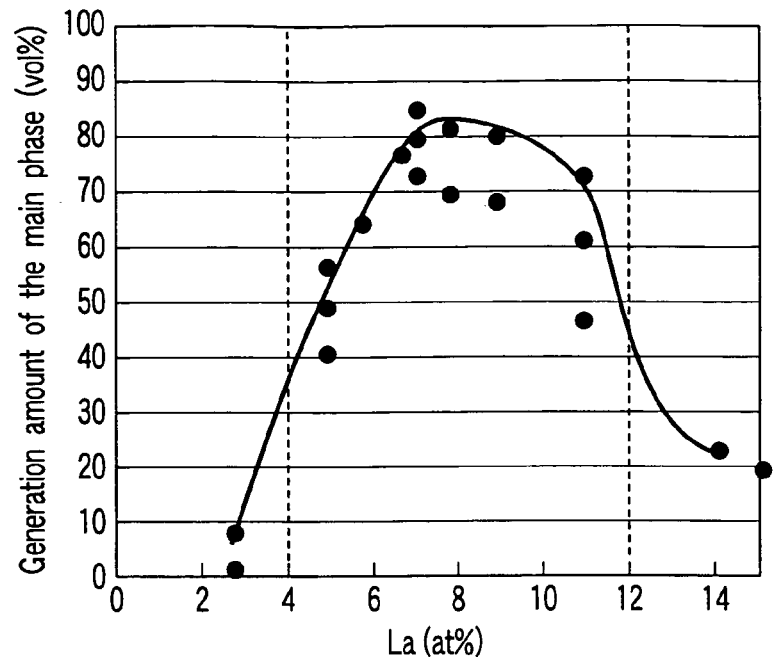
FIG. 6 is a graph showing the relationship between a La content and the generation amount of the main phase of an $NaZn_{13}$ type crystal structure.

The precipitation ratio of a phase of $NaZn_{13}$ type crystal structure exhibiting a high magnetocaloric effect greatly varies depending upon annealing conditions and the La content. This fact has been elucidated by optical microscopic observation and X-ray diffraction. Then, the precipitation ratio of a phase of an $NaZn_{13}$ type crystal structure was evaluated with respect to La content for the samples different in composition and annealed in various conditions above. The results are shown in FIG. 6. In FIG. 6, particles exhibiting the highest precipitation ratio of an $NaZn_{13}$ type crystal structure among the samples of each chemical composition were selected and plotted. From this figure, it was clear that the favorable La content falls within the range of about 4 to 12%.

The phase precipitation ratio was estimated based on the dependency of magnification upon temperature as described below. More specifically, test pieces were cut out from the samples in the form of a needle in order to eliminate the effect of a demagnetic field. The magnetization of the test pieces was measured by changing temperature from low to high under a magnetic field of H=1 KOe (oersteds), which is equivalent to 0.1 tesla. As a result, the dependency of magnetization upon temperature was obtained. In most of the samples where an $NaZn_{13}$ type crystal structure phase precipitated, it was confirmed that these samples are constituted principally of an $NaZn_{13}$ type crystal structure phase and an iron alloy phase. There two phases exhibit magnetization; however, their Tc (Curie temperature) values greatly differ. Based the ratio of magnetization of the two phases obtained from the dependency of magnetization upon temperature (the change of magnetization from low to high temperature range), the ratio of an $NaZn_{13}$ type crystal structure phase to an iron phase can be estimated. The Tc value used herein does not stringently mean the Curie temperature lower than which spontaneous magnetization occurs. The Tc value refers to a critical temperature at which low magnetization state changes to a high magnetization state.

Figure 7:
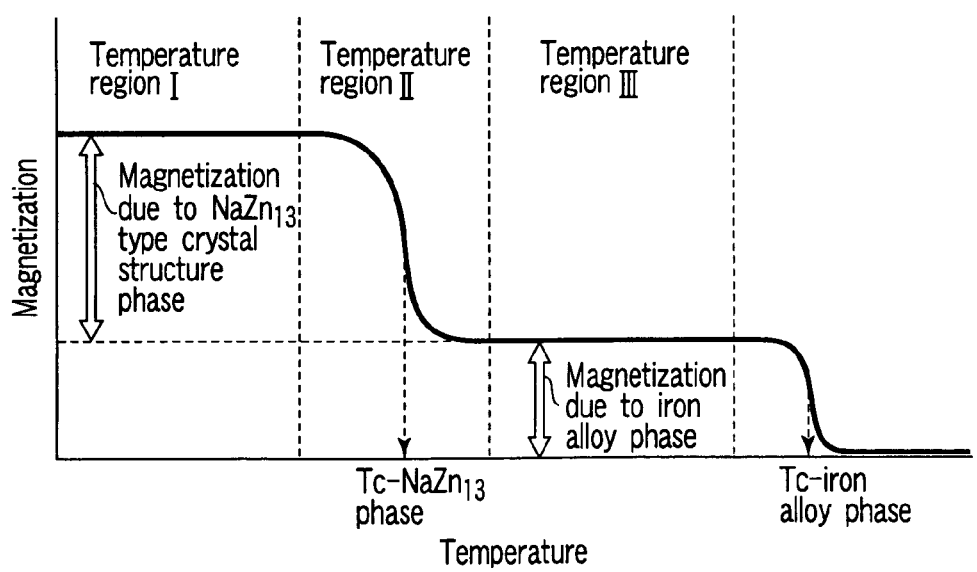
FIG. 7 is a schematic illustration showing the dependency of magnetization of a sample upon temperature, where the sample primarily constituted of a phase having an $NaZn_{13}$ type crystal structure and an iron alloy phase.

FIG. 7 shows a curve showing a characteristic change of magnetization depending upon temperature. The Tc of the $NaZn_{13}$ type crystal structure phase is present in the temperature region II and the Tc of an iron alloy phase is present in a temperature region higher than the temperature region III. Therefore, in the temperature region III, the iron alloy phase is in a high magnetization state where most of the magnetic spins are aligned along the direction of an external magnetization field. In contrast, the NaZn$_{13}$ type crystal structure phase is in a low magnetization state where the magnetic spins are randomly oriented and the number of magnetic spins aligned in the direction of the external magnetic field is slightly larger than other spins. In the temperature region I, the two phases are in a high magnetization state where most of the magnetic spins are aligned in the direction of the external magnetic field. Therefore, based on the ratio of magnetization in the temperature region I and in the temperature region III, the constitutional ratio of two phases can be obtained. The constitutional ratio thus estimated is not accurate in the stringent sense; however, it is sufficient when the constitutional ratio of an NaZn$_{13}$ type crystal structure phase is compared between samples having different La contents.

<Mechanical Strength of Spherical Particles>

Spherical particles having an intermetallic compound phase of an NaZn$_{13}$ type precipitated by the aforementioned method were investigated for mechanical strength from a practical point of view. As a result, it was found that the mechanical strength of spherical particles strongly relates to the structure of a microstructure within a particle. The mechanical strength test was performed as follows and the results will be explained below.

First, spherical particles having the major axis of 2.0 mm or less and having a large amount of an intermetallic compound phase of an NaZn$_{13}$ type precipitated therein were classified into groups based on the type of mother alloy, particle diameter range and annealing conditions. From each of the groups, particles having an aspect ratio of 2 or less were chosen and thereby samples each containing about 30 g of particles was prepared. A cylinder (12.5 inner diameter and 50 mm height) was packed with particles of each sample as dense as possible up to a height of 45 mm so as to have a clearance of 5 mm from the top of the cylinder and sealed tight. This is made to increase the effect of a vibration test. As to each sample, the weight (Wo) of the particles packed in this manner was measured.

Figure 8:
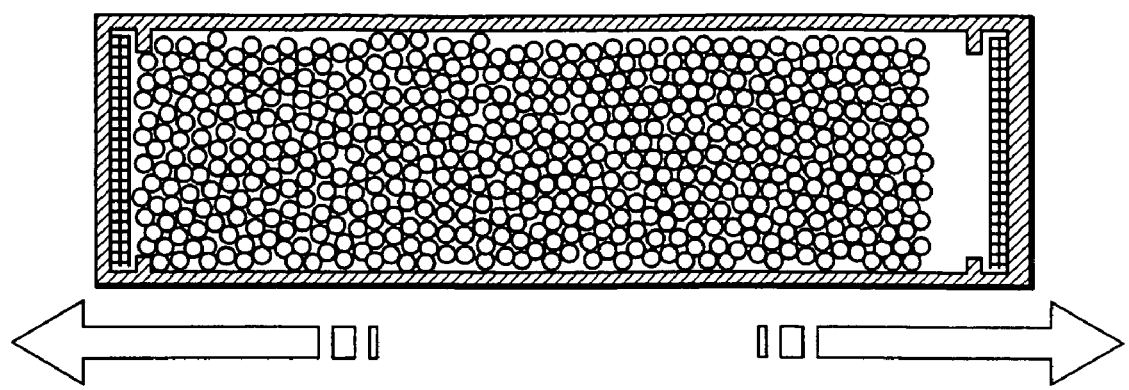
FIG. 8 is a schematic view for explaining a vibration test.

Next, as shown in FIG. 8, cylinders are laid horizontally and fixed on a vibrator, and a vibration test was performed. After vibration was continued for a week, particles were observed by opening cylinders. Fine powder was observed in every sample. The fine powder was washed with water, collected by a filter and the weight (Wp) thereof was measured. To investigate the relationship between the mechanical strength and the metal texture, the remaining spherical particles of each sample were sectioned and subjected to the observation by X-ray diffraction and SEM.

Figure 12:
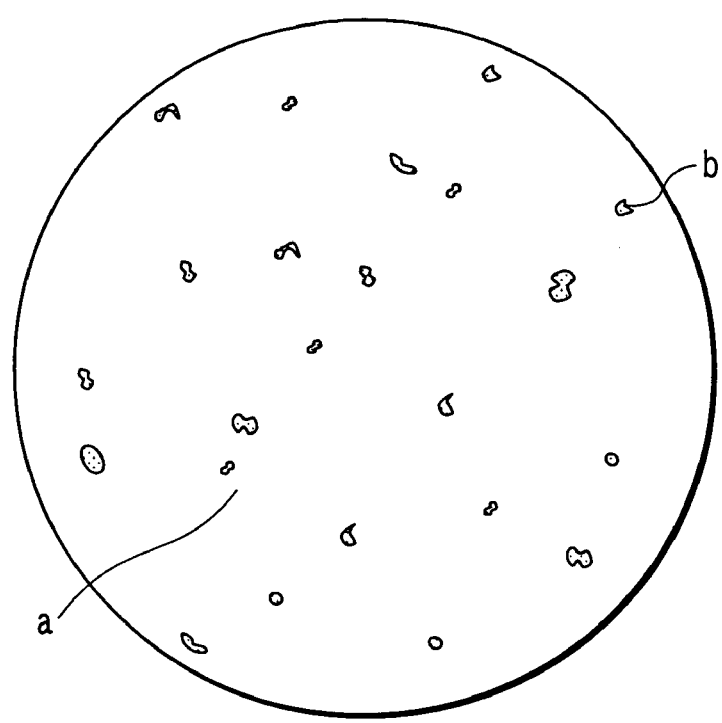
FIG. 12 is a view showing a section of a microstructure of sample 106.
Figure 13:
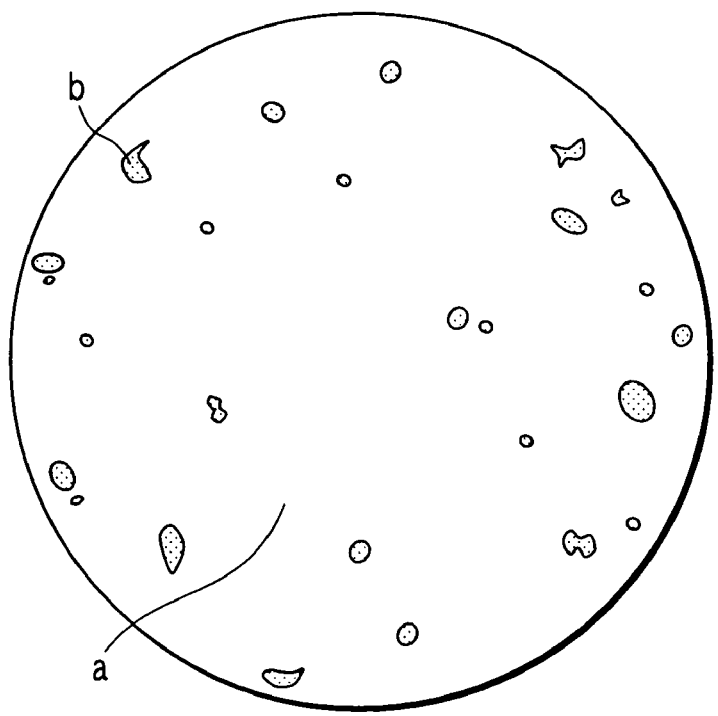
FIG. 13 is a view showing a section of a microstructure of sample 107.

In samples 101 to 111, an intermetallic compound phase of an NaZn$_{13}$ type and an iron alloy phase of a bcc crystal structure were observed. As a result of SEM observation of a particle section, excluding 104, a first phase was an intermetallic compound phase of an NaZn$_{13}$ type crystal structure containing Fe, Co, Si, and La, and a second phase was an iron alloy phase of a bcc crystal structure containing Si and Co in samples 101 to 111. In sample 104, the intermetallic compound phase of an NaZn$_{13}$ type crystal structure and the iron alloy phase of a bcc crystal structure containing Si and Co are almost equivalently present. The ratio of an iron alloy phase differs depending upon samples. In particular, the ratio of an iron alloy phase was extremely low in samples 106 and 107, which are respectively shown in FIGS. 12 and 13 (schematic illustration). Furthermore, a microstructure was complicated and greatly differs between samples.

In samples No. 112 and 113, an intermetallic compound phase of an NaZn$_{13}$ type crystal structure containing of Fe, Co, Ni, Si and La and iron alloy phases of bcc and fcc crystal structures were observed. In samples No. 114 and 115, an intermetallic compound phase of an NaZn$_{13}$ type crystal structure and iron alloy phases of a bcc crystal structure were observed. All iron alloy phases observed in samples No. 112 to 115 contained Si. In samples No. 116 to 120, an intermetallic compound phase of an NaZn$_{13}$ type crystal structure containing of Fe, Co, Si, and La and iron alloy phases of a bcc crystal structure were observed. All iron alloy phase observed in sample No. 116 to 120 contained Si.

In each sample, a metal texture is constituted of a plurality of precipitated phases different in structure.

Figure 9:
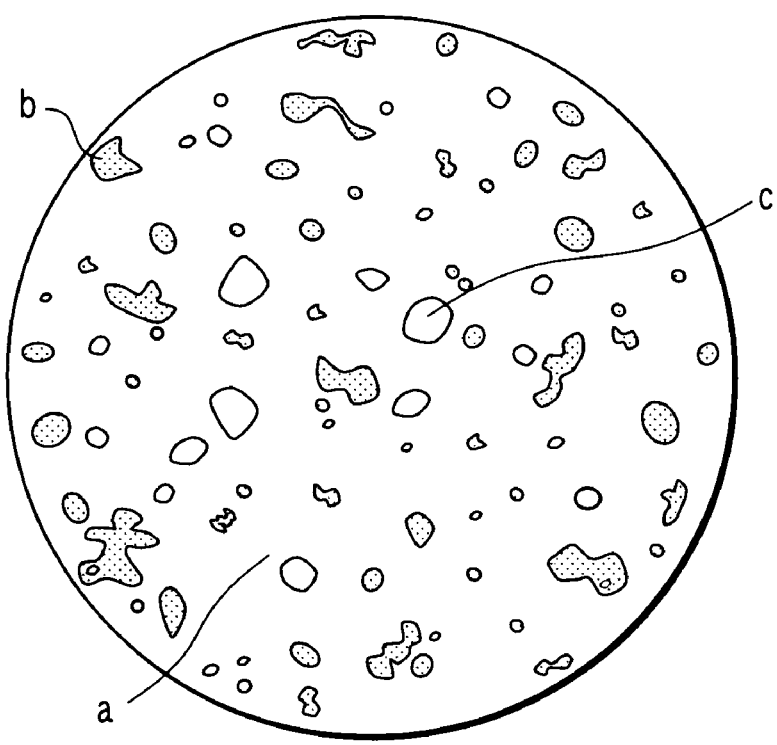
FIG. 9 is a view showing a section of a microstructure of sample 105.

For example, samples 101 and 105, as is shown in FIGS. 10 and 9, respectively, it was found that a second phase, that is, an iron alloy phase (b), of a bcc crystal structure containing Si and Co was finely scattered in a main phase (a) of an intermetallic compound of an NaZn$_{13}$ type crystal structure containing of Fe, Co, Si, and La. Besides this, an intermetallic compound phase (c) containing La as a principal element and also containing Si and Co was observed. In some of the samples (for example No. 104), a second phase, an iron alloy phase (b) containing Si of a bcc crystal structure, were localized, as shown in FIG. 11 (schematic illustration).

In samples Nos. 118 and 120, the same microstructure as those of samples Nos. 101 and 105 were observed. In sample No. 116, a second phase, an iron alloy phase (b) of a bcc crystal structure containing Si and Co, and a third phase, an intermetallic compound phase (c) containing La as a principal element and Si as a secondary dominant element, were observed to be in a main phase, an intermetallic compound phase (a) of an NaZn$_{13}$ type crystal structure containing of Fe, Co, Si, and La,.

Figure 14:
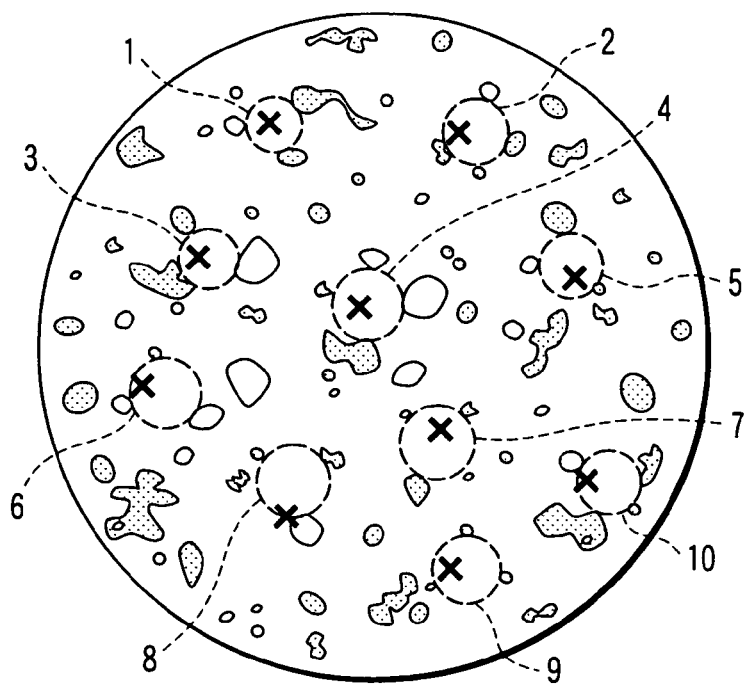
FIG. 14 is a view for explaining a method of measuring the average size of expansion of a first phase on the microstructure of sample 105.
Figure 15:
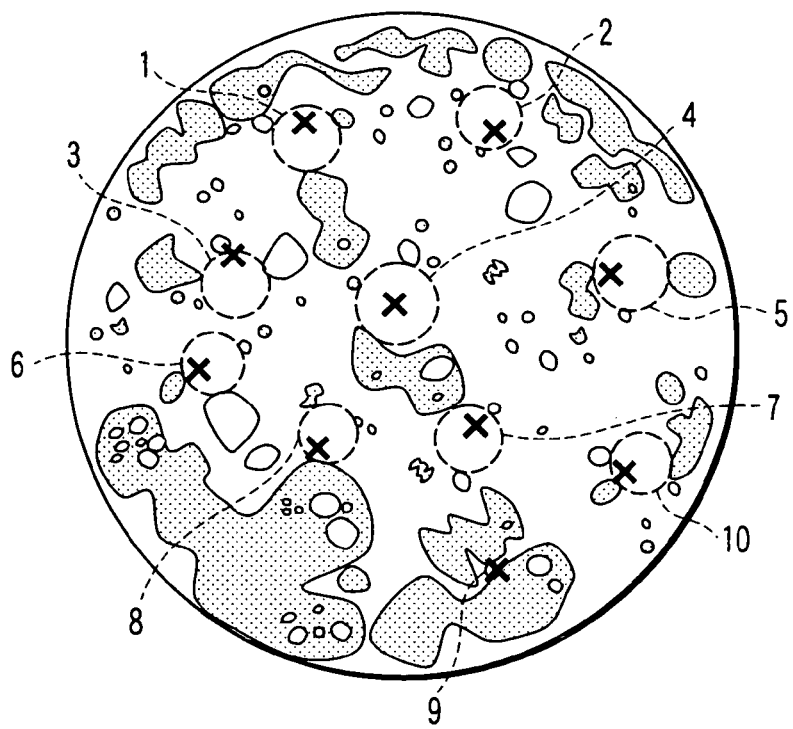
FIG. 15 is a view for explaining a method of measuring the average size of expansion of a first phase on the microstructure of sample 104.
Figure 16:
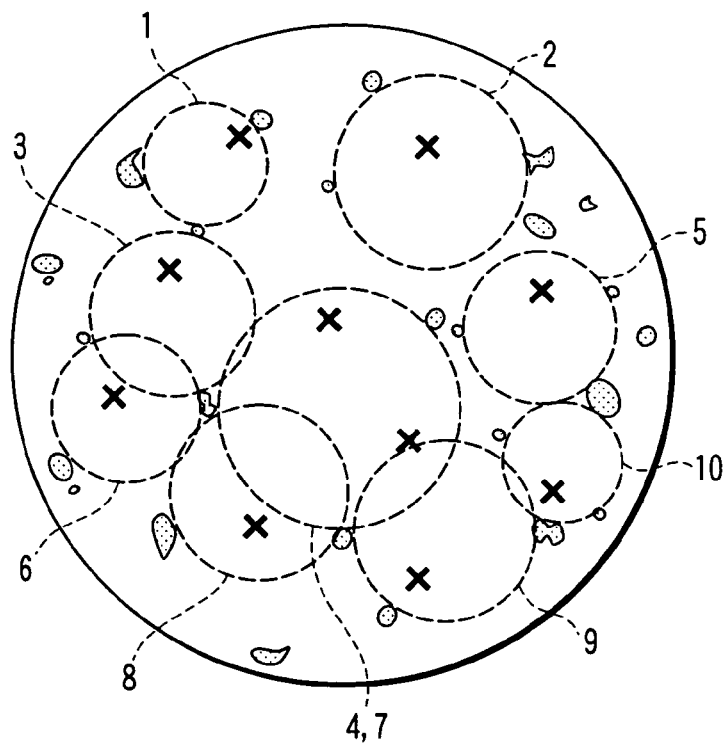
FIG. 16 is a view for explaining a method of measuring the average size of expansion of a first phase on the microstructure of sample 107.

Subsequently, the expansion size of an intermetallic compound phase of an NaZn$_{13}$ type was measured by the method defined above to obtain an average expansion. FIGS. 14 to 16 shows how to measure the expansion of the intermetallic compound phase (first phase) of specific examples shown in FIGS. 9, 11 and 13. Table 4 shows the average expansion of an intermetallic compound phase with respect to samples 101 and 120.

TABLE 4

Average expansion size of intermetallic compound of NaZn$_{13}$ type crystal structure

| Sample | Mother alloy | Particle size (mm) | Average expansion size of NaZn$_{13}$ phase (μm) |
|---|---|---|---|
| 101 | B | 0.2–0.43 | 32 μm |
| 102 | B | 0.2–0.43 | 14 μm |
| 103 | B | 0.5–0.71 | 22 μm |
| 104 | B | 0.5–0.71 | 55.5 μm |
| 105 | B | 0.5–0.71 | 60.5 μm |
| 106 | C | 0.5–0.71 | 106 μm |
| 107 | C | 0.5–0.71 | 157 μm |
| 108 | B | 0.85–1.2 | 75 μm |
| 109 | B | 0.85–1.2 | 133 μm |
| 110 | B | 1.4–2.0 | 84 μm |
| 111 | B | 1.4–2.0 | 164 μm |
| 112 | H | 0.5–0.71 | 41 μm |

TABLE 4-continued

Average expansion size of intermetallic compound of NaZn$_{13}$ type crystal structure

| Sample | Mother alloy | Particle size (mm) | Average expansion size of NaZn$_{13}$ phase (μm) |
|---|---|---|---|
| 113 | H | 0.71–0.85 | 122 μm |
| 114 | I | 0.5–0.71 | 83 μm |
| 115 | I | 0.5–0.71 | 183 μm |
| 116 | L | 0.5–0.71 | 65 μm |
| 117 | L | 0.5–0.71 | 138 μm |
| 118 | M | 0.5–0.71 | 62 μm |
| 119 | M | 0.5–0.71 | 164 μm |
| 120 | K | 0.5–0.71 | 48 μm |

Figure 17:
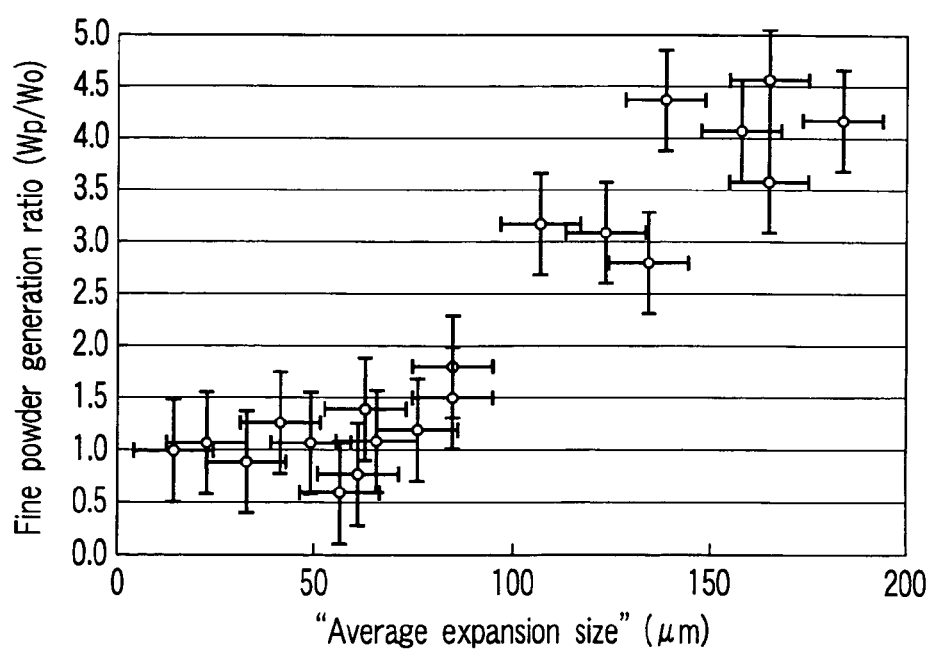
FIG. 17 is a graph showing the relationship between an average size of expansion of a first phase and a generation ratio of fine powder.

FIG. 17 shows the average expansion size of an intermetallic compound phase of an NaZn$_{13}$ type (shown in Table 4) versus the fine powder generation rate (Wp/Wo) during the vibration test. As shown in the figure, the mechanical strength of spherical particles of about 0.2 to 2 mm diameter is significantly correlated to the structure of the microstructure inside a particle. In particular, it was found that when the average expansion size of an intermetallic compound phase of an NaZn$_{13}$ type crystal is made to fall within 100 μm, the mechanical strength can be maintained relatively high.

In the case of such a structure, in addition of a first phase constituted of an NaZn$_{13}$ type intermetallic compound and a second phase constituted of an iron alloy phase, a third phase constituted of an intermetallic phase containing La as a principal element and also containing Si, Co or Ni was observed.

<Example of Spherical Particles of Magnetic Composite Material for Magnetic Refrigeration>

Now, a test operation for refrigeration was performed by a simple prototype apparatus from a practical point of view. In a first place, a mother alloy J containing Fe, Co, Si, La in the ratio of about 81:6:5:8 was molded. Then, the mother alloy was processed into an electrode rod. The electrode rod was rotated at a rotation rate from 8,000 to 12,000 rpm in accordance with the rotating electrode process, to obtain spherical particles. The spherical particles were heat-treated at a temperature of 1050° C. for 11 days to precipitate a large amount of an NaZn$_{13}$ type intermetallic compound phase. The spherical particles are classified by screens into the following 9 classes: 0.1 to 0.2 mm, 0.2 to 0.43 mm, 0.43 to 0.6 mm, 0.5 to 0.71 mm, 0.71 to 0.85 mm, 0.85 to 1 mm, 1 to 1.4 mm, 1.4 to 2 mm, and 2 mm or more.

Spherical particles of each class were packed in a pipe formed of a nonmagnetic material having an inner diameter of 8 mm. Both ends of the pipe were fixed with a mesh so as not to move particles. The length of the pipe packed with the particles was 70 mm and care was taken to pack the particles as dense as possible.

Figure 18:
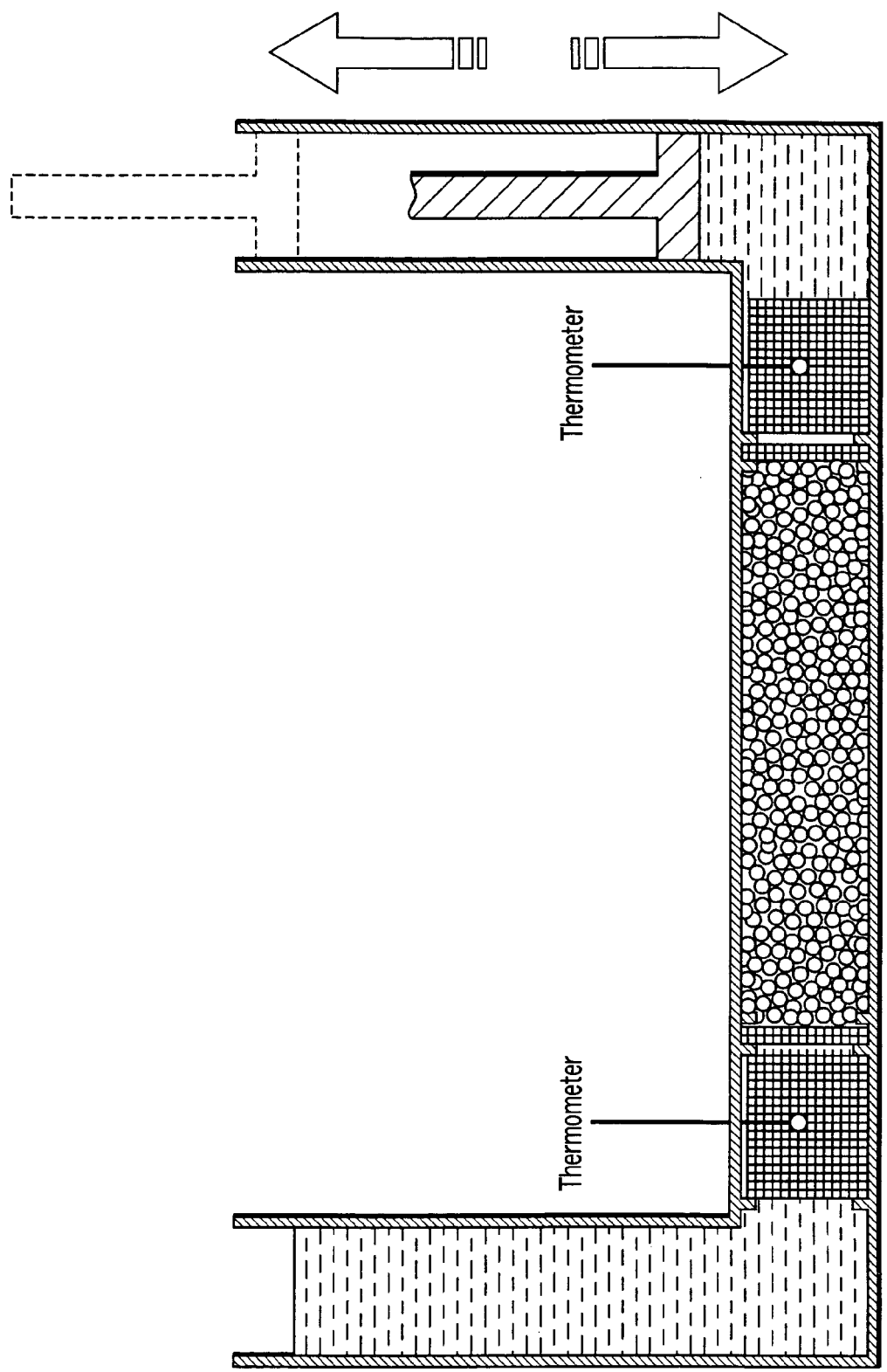
FIG. 18 shows a schematic structure of a test operation for refrigeration.

FIG. 18 shows a schematic structure of a test apparatus. The pipe packed with the spherical particles prepared above was placed at the bottom of a U-shaped apparatus. As shown in the figure, one of the ends of the U-shaped apparatus was opened. The other end was equipped with a piston. The pipe was fully filled with a mixture of ethanol and water serving as a medium for heat exchange. Outside the pipe, a pair of horizontally movable permanent magnets were arranged so as to apply a magnetic field to and remove the magnetic field from the spherical particles packed in the pipe.

In the test operation for refrigeration, applying a magnetic field to and removing the magnetic field from the spherical particles packed in a pipe were repeated. In synchronisms with the repeated operation, the piston was moved up and down to move the heat exchange liquid medium. To describe more specifically, the following cycle was repeatedly performed.

Step 1: applying a magnetic field to the spherical particles;

Step 2: transferring a heat exchange medium to the forward direction;

Step 3: demagnetizing the spherical particles; and

Step 4: transferring the heat exchange medium to the backward direction.

In this test, the temperature of both ends of the pipe packed with the spherical particles was monitored by thermometers. The cycle was repeated 50 times.

Figure 19:
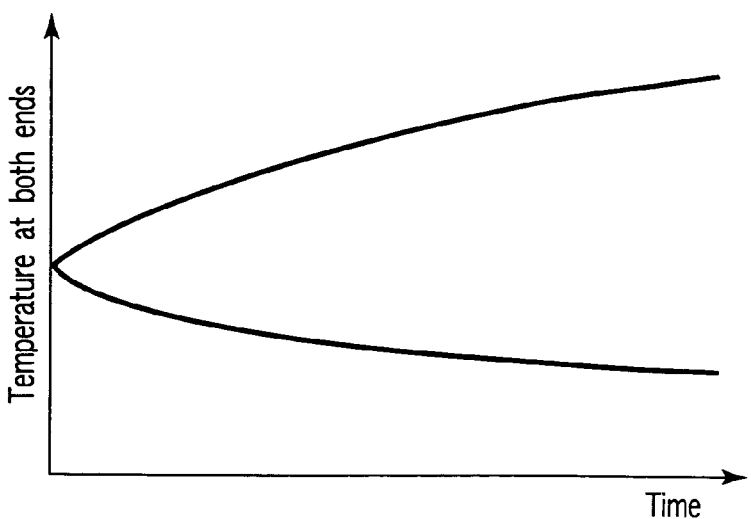
FIG. 19 is a schematic graph showing the results of a test operation for refrigeration (magnetic particle diameter: 0.71 to 0.85 mm)

As a result, in any one of the classes of particles having a diameter of 0.2 to 0.43 mm, 0.43 to 0.6 mm, 0.5 to 0.71 mm, 0.71 to 0.85 mm, 0.85 to 1 mm, 1 to 1.4 mm, and 1.4 to 2 mm, it was found that the difference in temperature between the both ends goes up with the increased number of cycle repetitions. FIG. 19 shows the profile of temperature change when particles of 0.71 to 0.85 mm in diameter was used. In particular, cooling effect was large in the classes of particles of 0.43 to 0.6 mm, 0.5 to 0.71 mm, 0.71 to 0.85 mm and 0.85 to 1 mm.

Figure 20:
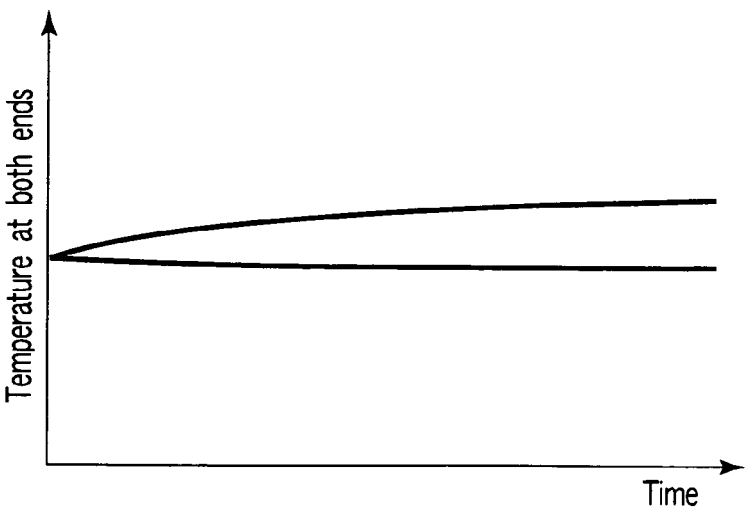
FIG. 20 is a schematic graph showing the results of a test operation for refrigeration (magnetic particle diameter: 2 mm or more)
Figure 21:
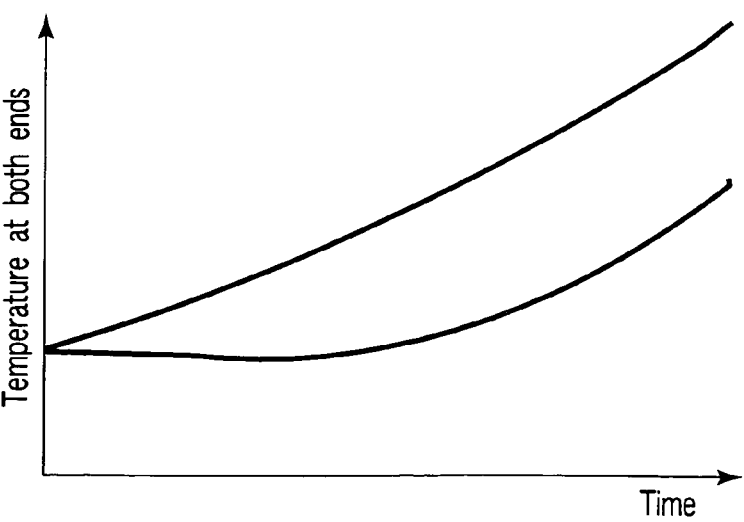
FIG. 21 is a schematic graph showing the results of a test operation for refrigeration (magnetic particle diameter: 0.1 to 0.2 mm)

In the case of particles having a diameter of 2 mm or more, constant temperature change was not obtained, in other words, the profile of the temperature change differed in every test. FIG. 20 shows the profile of temperature change when the particles having a diameter of 2 mm or more was used. On the other hand, when particles of 0.1 to 0.2 mm in diameter was used, the temperature increase was observed at both ends of the pipe packed with particles with an increased number of cycle repeats.

Incidentally, prior to the test operation mentioned above, a preliminary test was performed using pure water as a heat exchange medium. As a result, rust is slightly formed on the surface of spherical particles. Therefore, in the test operation for refrigeration mentioned above, a mixture of pure water and ethanol were used and a protecting layer was densely formed over the surface of spherical particles by applying boron nitride thereto. As a result, rust was not formed.

The surface of spherical particles may be coated by AlN spraying, Au plating or paint coating besides the BN spraying. According to the investigation, when the protecting layer was formed by BN thermal spraying, AlN spraying, and Au plating, the protecting layer was effective both when pure water was used and when a mixture of pure water and ethanol were used as a heat exchange medium. On the other hand, in the case of paint coating, the protecting layer was effective when pure water was used; however, the less effective when a mixture of pure water and ethanol was used as a heat exchange medium.

<Example of Spherical Particles Formed of Sintered Magnetic Material for Magnetic Refrigeration>

Spherical particles manufactured by the rotating electrode process is subjected to annealing to precipitate an intermetallic compound phase having an NaZn$_{13}$ type crystal structure. At this time, if spherical particles were packed in a case of a predetermined shape and then subjected to the annealing, a sintered body of the spherical particles can be obtained. For example, when a Ta foil case was used in a test, a porous sintered body having spherical particles adhered to each other was obtained. After the annealing, the Ta foil was easily removed from the sintered body.

On the other hand, spherical particles prepared from another mother alloy in the rotating electrode process were subjected to annealing. After an intermetallic compound phase having an $NaZn_{13}$ type crystal structure was precipitated in this manner, the spherical particles were packed in a case having a predetermined shape and subjected to annealing at about 800° C. for 2 days. As a result, a sintered body having spherical particles adhered to each other at a point was obtained in the same as above. It turned out that when the content of La in a mother alloy is relatively high (i.e., 7 to 12 atomic %), a sintered body having sufficient mechanical strength can be obtained even by sintering at such a low temperature.

The voidage of the sintered body can be controlled by changing a packing density of spherical particles in a case. The density is changed by controlling particle diameters, aspect ratios and the size distribution of particles. In this way, a sintered body having a voidage of 25% or more to 60% or less can be produced.

As described above, if spherical particles are adhered to each other by sintering, it is possible to prevent the particles from moving by a flow of a heat exchange medium, hitting each other and striking the wall of a packing container in a magnetic refrigeration system. Since the impact given to spherical particles is kept low, it is possible to prevent the spherical particles from damage. By virtue of this, even if a magnetic material has a relatively brittle intermetallic compound phase having an $NaZn_{13}$ type crystal structure as a main phase, it is possible to prevent generation of fine particles. As a result, there is a low possibility that an increase of pressure loss lowers refrigeration performance, and thus. Therefore, the performance of a heat exchanger can be maintained for a long period.

<Embodiment of Magnetic Refrigeration System>

Figure 22:
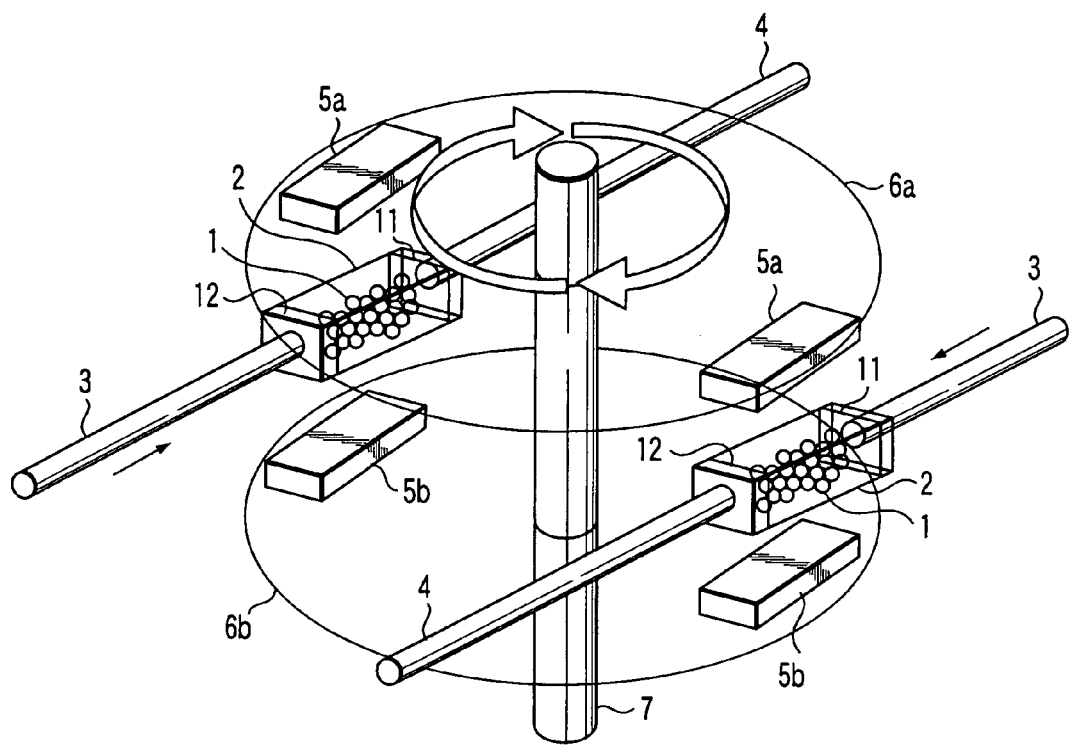
FIG. 22 is a schematic view of a structure of a magnetic refrigeration system to which a magnetic material according to the embodiment the present invention is used.
Figure 23:
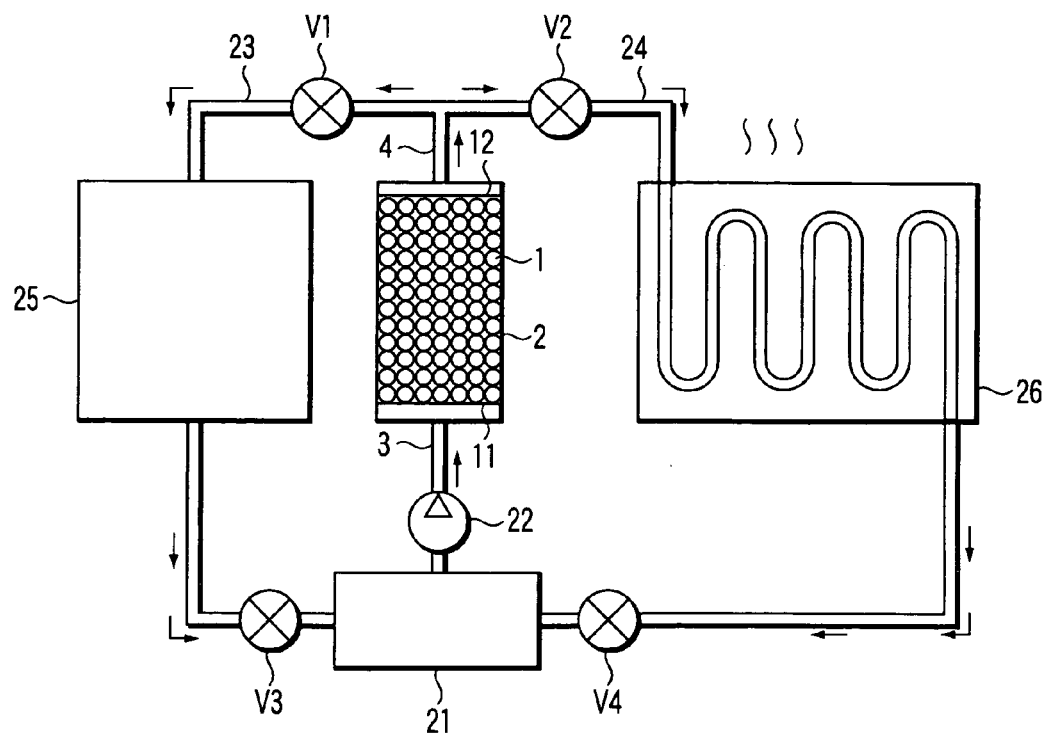
FIG. 23 is a schematic diagram of a circulation system for a heat exchange medium of a magnetic refrigeration system using a magnetic material according to the embodiment the present invention.

FIG. 22 shows a schematic structure of a magnetic refrigeration system using the magnetic material based on the present invention. FIG. 23 is a schematic diagram of a heat exchange medium circulating system of the magnetic refrigeration system. In the figure, reference numeral 1 denotes a magnetic material; 2, a magnetic refrigerating chamber; 3, an inlet pipe, 4 an outlet tube; 5a and 5b permanent magnets; 6a and 6b, rotation tables; 25, low temperature consumption facility; and 26 a radiator.

As shown in FIG. 22, the magnetic refrigerating chamber 2 is a hollow column having a rectangular section. Mesh grids 11 and 12 are attached near the end portions of the magnetic refrigerating chamber 2. The magnetic material 1 based on the present invention is packed between these mesh grinds 11 and 12. The magnetic material 1 consists of spherical particles having an average diameter of 0.6 mm and packed in the magnetic refrigerating chamber 2. The volume ratio of the chamber 2 packed with the spherical particles is 62%. The mesh size of the mesh grids 11 and 12 is #80 and the diameter of Cu wire is 0.14 mm. To one end of the magnetic refrigerating chamber 2, the inlet pipe 3 for introducing a heat exchange medium is connected. To the other end, the outlet pipe 4 for discharging a heat exchange medium is connected. Note that, in this embodiment, two identical-shaped magnetic refrigerating chambers 2 are arranged in parallel to each other.

The two magnetic refrigerating chambers 2 are sandwiched by a pair of rotation tables 6a and 6b, which are supported by a common rotation axis 7 positioned at the center of a line connecting two magnetic refrigerating chambers 2. The permanent magnet 5a and 5b are fixed to a portion just inside the circumferences of the rotation tables 6a and 6b, respectively. These permanent magnets 5a and 5b are arranged so as to face each other and connected to each other via a yolk (not shown).

By this arrangement, a magnetic field is formed in a space between the pair of permanent magnets 5a and 5b. In this embodiment, two magnetic refrigerating chambers 2 each are sandwiched by a pair of permanent magnets 5a and 5b and arranged with the rotation axis 7 interposed between them.

The rotation tables 6a and 6b are rotated by an angle of 90° per time. The permanent magnets alternately come closer to and go away from the magnetic refrigerating chamber 2. When the permanent magnets come closer to the magnetic refrigerating chamber 2, the magnetic refrigerating chamber 2 is placed within the magnetic field produced by the permanent magnets 5a and 5b. Therefore, the magnetic field is applied to a magnetic material 1 contained in the chamber.

When the magnetic material 1 is switched from a magnetized state to a demagnetized state, the entropy of a magnetic spin system increases, and the entropy is transferred between the lattice system and the electromagnetic spin system. It follows that the temperature of the magnetic material 1 decreases, and the heat exchange medium is cooled by the magnetic material 1. Then, the heat exchange medium thus cooled is discharged from the magnetic refrigerating chamber 2 outside through an outlet pipe 4, and supplied as a refrigerant to the low temperature consumption facility 25 (see FIG. 23).

As shown in FIG. 23, a storage tank 21 for storing a heat exchange medium is provided on the upstream side of the inlet pipe 3. A pump 22 is provided midway along the inlet pipe 3. The outlet pipe 4 is started from the magnetic refrigerating chamber 2 and branched into two circulation lines, cooling line 23 and precooling line 24. In the middle of the cooling line 23, a valve V1, a low temperature consumption facility 25, and a valve V3 are provided. The end of the refrigeration line 23 is connected to the storage tank 21. In the middle of the precooling line 24, a valve V2, a radiator 26, and valve V4 are provided. The end of the pre-cooling line is connected to the storage tank 21.

Next, the operation of the magnetic refrigeration system will be explained. The operation of the magnetic refrigeration system is alternated between precooling step and cooling step.

First, in the precooling step, valves V2 and V4 are opened while closing valves V1 and V3, thereby supplying a heat exchange medium through the precooling line 24. In this state, permanent magnets 5a and 5b (see FIG. 22) are approached to the magnetic refrigerating chamber 2. When a magnetic field is applied to the magnetic material 1, the temperature of the magnetic material 1 rises, and heat is transmitted to the heat exchange medium to raise its temperature. The heat exchange medium thus warmed up is sent from the magnetic refrigerating chamber 2 through the outlet pipe 4 and passed through the valve 2 and introduced into the radiator 26, and then cooled therein. The cooled heat exchange medium is returned to the storage tank 21 through the valve V4.

When the temperature of the magnetic material 1 in the magnetic refrigerating chamber 2 is reduced virtually equal to the temperature of the heat exchange medium supplied to the magnetic refrigerating chamber 2 through the inlet pipe 3, the valves V2 and V4 are closed, thereby terminating the precooling step. Operation goes to a cooling step.

In the cooling step, first, the permanent magnets 5a, 5b (see FIG. 22) are moved away from the magnetic refrigerating chamber 2. Then, valves V1 and V3 are opened to supplying the heat exchange medium through the cooling line 23. When a magnetic field is removed from the magnetic material 1, the temperature of the magnetic material 1 decreases, and the heat exchange medium is cooled by the magnetic material 1. In this way, the cooled heat exchange medium is sent from the magnetic refrigerating chamber 2 through the outlet pipe 4, passed through the valve V1, and introduced into the low temperature consumption facility 25. The heat exchange medium is used in the low temperature consumption facility 25 and increased in temperature, and thereafter returned to the storage tank 21 through the valve V3.

When the temperature of the magnetic material 1 in the magnetic refrigerating chamber 2 rises nearly equal to the temperature of the heat exchange medium supplied to the magnetic refrigerating chamber 2 through the inlet pipe 3, the valve V1 and V3 are closed, thereby terminating the cooling step. Operation goes to a precooling step.

A controller (not shown) of the magnetic refrigeration system controls valves V1 to V4 in synchronisms with the movement of the permanent magnets 5a and 5b, thereby alternating the precooling step and cooling step.

What is claimed is:

1. A magnetic composite material comprising at least two phases and used as a working substance in a magnetic refrigeration system, wherein
   a first phase is composed of an intermetallic compound represented by a general formula:

$La(Fe(Co,Ni)Si)_{13}$, having an $NaZn_{13}$ type crystal structure, and precipitated in an expansion size of 100 µm or less in average; and
   a second phase is composed of an iron alloy containing Si.

2. The magnetic composite material according to claim 1, containing Fe as a principal component, La in an amount from 4 atomic % to 12 atomic %, Si in an amount from 2 atomic % to 21 atomic %, and Co and Ni in a total amount from 0 atomic % to 11 atomic %; and the total amount of Fe, Co and Ni being from 75 atomic % to 92 atomic %.

3. The magnetic composite material according to claim 1, wherein the second phase has a body-centered cubic crystal structure or a face-centered cubic crystal structure.

4. The magnetic composite material according to claim 1, further comprising a third phase composed of a compound containing La as a principal element.

5. A particle formed of a magnetic composite material which is constituted of at least two phases and used as a working substance in a magnetic refrigeration system, wherein
   a first phase is composed of an intermetallic compound represented by a general formula:

$La(Fe(Co,Ni)Si)_{13}$, having an $NaZn_{13}$ type crystal structure, and precipitated in an expansion size of 100 µm or less in average;
   a second phase is composed of an iron alloy containing Si; and
   the particle is a sphere or a spheroid of 0.2 mm or more in the minor axis and 2 mm or less in the major axis.

6. The particle formed of a magnetic composite material according to claim 5, wherein the magnetic composite material contains Fe as a principal component, La in an amount from 4 atomic % to 12 atomic %, Si in an amount from 2 atomic % to 21 atomic %, and Co and Ni in a total amount from 0 atomic % to 11 atomic %; the total amount of Fe, Co and Ni being from 75 atomic % to 92 atomic %.

7. The particle formed of magnetic composite material according to claim 5, wherein the second phase is a body-centered cubic crystal structure or a face-centered cubic crystal structure.

8. The particle formed of magnetic composite material according to claim 5, further comprising a third phase composed of a compound containing La as a principal element.

9. A magnetic material sintered body used as a working substance in the magnetic refrigeration system, prepared by sintering particles constituted of at least two phases at a temperature lower than a melting point of the magnetic composite material, thereby combining the particles through diffusion of constituent elements, wherein
   a first phase is composed of an intermetallic compound represented by a general formula:

$La(Fe(Co,Ni)Si)_{13}$, having an $NaZn_{13}$ type crystal structure, and precipitated in an expansion size of 100 µm or less in average;
   a second phase is composed of an iron alloy containing Si; and
   the particle is a sphere or a spheroid of 0.2 mm or more in the minor axis and 2 mm or less in the major axis.

10. The magnetic material sintered body according to claim 9, wherein the magnetic composite material contains Fe as a principal component, La in an amount from 4 atomic % to 12 atomic %, Si in an amount from 2 atomic % to 21 atomic %, and Co and Ni in a total amount from 0 atomic % to 11 atomic %; the total amount of Fe, Co and Ni being from 75 atomic % to 92 atomic %.

11. The magnetic material sintered body according to claim 9, wherein the second phase is a body-centered cubic crystal structure or a face-centered cubic crystal structure.

12. The magnetic material sintered body according to claim 9, further comprising a third phase composed of a compound containing La as a principal element.

13. The magnetic material sintered body according to claim 9, wherein the particles composed of the magnetic composite material are contained in 70% by weight or more and a voidage from 25% to 60%.

14. A method for producing a magnetic composite material for use in a magnetic refrigeration system as a working substance, comprising:
   a first step of producing an ingot comprising, as a main phase, an Si-containing iron alloy of a body-centered cubic structure which is formed by melting a raw material containing Fe as a principal component, La in an amount from 4 atomic % to 12 atomic %, Si in an amount from 2 atomic % to 21 atomic %, and Co and Ni in a total amount from 0 atomic % to 11 atomic %; the total amount of Fe, Co and Ni being from 75 atomic % to 92 atomic %;
   a second step of producing a particle, plate or wire form intermediate constituted of at least two phases including a main phase formed of an Si-containing iron alloy and a sub phase formed of La as a principal component; and
   a third step of subjecting the intermediate to annealing to diffuse constituent elements each other, thereby precipitating an intermetallic compound represented by a general formula:

$La(Fe(Co,Ni)Si)_{13}$, and having an $NaZn_{13}$ type crystal structure.

15. The method according to claim 14, wherein, in the second step, the ingot is processed into an electrode rod, which is then melted by a rotating electrode process to obtain the intermediate of particle form.

16. The method according to claim 14, wherein the intermediate is a spherical or a spheroidal particle having the minor axis of 0.2 mm or more and the major axis of 2 mm or less.

17. The method according to claim 14, wherein the intermediate is a plate manufactured by rolling the ingot.

18. The method according to claim 14, wherein the intermediate is a wire manufactured by drawing the ingot.

19. A magnetic refrigeration system comprising
a magnetic refrigerating chamber packed with a magnetic material;
an inlet pipe for introducing a heat exchange medium into the magnetic refrigerating chamber;
an outlet pipe for discharging the heat exchange medium from the magnetic refrigerating chamber;
movable permanent magnets arranged in the proximity of the magnetic refrigerating chamber; and
a driving unit for moving positions of the permanent magnets relative to the magnetic refrigerating chamber, thereby applying a magnetic field to and removing the magnetic field from the magnetic material,
wherein
the magnetic material is a magnetic composite material constituted of at least two phases including
a first phase composed of an intermetallic compound represented by a general formula:

$$La(Fe(Co,Ni)Si)_{13}$$

having an $NaZn_{13}$ type crystal structure, and precipitated in an expansion size of 100 μm or less in average; and
a second phase is composed of an iron alloy containing Si.

20. A magnetic refrigeration system comprising:
a magnetic refrigerating chamber packed with a magnetic material;
an inlet pipe for introducing a heat exchange medium into the magnetic refrigerating chamber;
a first outlet pipe for discharging the heat exchange medium used in precooling of the interior of the magnetic refrigerating chamber, from the chamber;
a second outlet pipe for discharging the heat exchange medium cooled in the magnetic refrigerating chamber, from the chamber;
movable permanent magnets arranged in the proximity of the magnetic refrigerating chamber;
a driving unit for moving positions of the permanent magnets relative to the magnetic refrigerating chamber, thereby applying a magnetic field to and removing the magnetic field from the magnetic material, and
a flow channel controlling unit for switching discharging channels of a heat exchange medium from the magnetic refrigerating chamber between the first outlet pipe and the second outlet pipe in synchronisms with relative movement of permanent magnets,
wherein
the magnetic material is a magnetic composite material constituted of at least two phases including
a first phase composed of an intermetallic compound represented by a general formula:

$$La(Fe(Co,Ni)Si)_{13}$$

having an $NaZn_{13}$ type crystal structure, and precipitated in an expansion size of 100 μm or less in average; and
a second phase is composed of an iron alloy containing Si.

* * * * *